(12) United States Patent
Aita

(10) Patent No.: US 11,453,319 B2
(45) Date of Patent: Sep. 27, 2022

(54) CONVEYANCE SEAT WITH A SLIDE RAIL INCLUDING A LOWER RAIL AND AN UPPER RAIL

(71) Applicant: TS TECH CO., LTD., Saitama (JP)

(72) Inventor: Shinya Aita, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 17/274,254

(22) PCT Filed: Sep. 9, 2019

(86) PCT No.: PCT/JP2019/035410
§ 371 (c)(1),
(2) Date: Mar. 8, 2021

(87) PCT Pub. No.: WO2020/054678
PCT Pub. Date: Mar. 19, 2020

(65) Prior Publication Data
US 2021/0354603 A1    Nov. 18, 2021

(30) Foreign Application Priority Data
Sep. 12, 2018    (JP) .............................. JP2018-170869

(51) Int. Cl.
*B60N 2/36* (2006.01)
*B60N 2/06* (2006.01)
(Continued)

(52) U.S. Cl.
CPC ................. *B60N 2/36* (2013.01); *B60N 2/06* (2013.01); *B60N 2/1625* (2013.01); *B60N 2/286* (2013.01)

(58) Field of Classification Search
CPC ...... B60N 2/06; B60N 2/1625; B60N 2/1615; B60N 2/36; B60N 2/286
(Continued)

(56) References Cited

U.S. PATENT DOCUMENTS

| 4,092,009 | A | * | 5/1978 | Koutsky | ................ | B60N 2/169 |
| | | | | | | 297/344.14 |
| 10,093,209 | B2 | * | 10/2018 | Peregrina Loera | .. | B60N 2/5816 |
| 2004/0108146 | A1 | * | 6/2004 | Rundell | .............. | B60R 21/0152 |
| | | | | | | 177/144 |

FOREIGN PATENT DOCUMENTS

| DE | 10335867 B3 | * | 2/2005 | ........... B60N 2/3011 |
| FR | 2984247 A1 | * | 6/2013 | ............... B60N 2/06 |

(Continued)

OTHER PUBLICATIONS

International Search Report dated Oct. 29, 2019 for the corresponding PCT Application No. PCT/JP2019/035410, with English machine translation.

*Primary Examiner* — Milton Nelson, Jr.
(74) *Attorney, Agent, or Firm* — Michael Best & Friedrich LLP

(57) ABSTRACT

A conveyance seat includes: a seat back; a seat cushion which includes a pair of cushion side frames extending in a front to back direction of the seat; a slide rail which slides the seat back and the seat cushion in the front to back direction of the seat; a connecting member connecting the seat cushion and the slide rail; and a first rotation portion which-rotatably connects the connecting member to the slide rail, the seat cushion is movable from a first height position to a second height position below the first height position in an up and down direction of the seat, and when the seat cushion moves to the second height position, the first rotation portion is disposed at the same height position as the slide rail in a side view of the conveyance seat to suppress an increase in size of the seat.

20 Claims, 23 Drawing Sheets

(51) Int. Cl.
*B60N 2/16* (2006.01)
*B60N 2/28* (2006.01)

(58) Field of Classification Search
USPC .......................................... 297/344.15, 344.13
See application file for complete search history.

(56) References Cited

FOREIGN PATENT DOCUMENTS

| | | | |
|---|---|---|---|
| JP | 2002-336069 A | | 11/2002 |
| JP | 2002336069 A | * | 11/2002 |
| JP | 2004-130994 A | | 4/2004 |
| JP | 2008-030659 A | | 2/2008 |
| JP | 2013-091344 A | | 5/2013 |
| JP | 2018-111394 A | | 7/2018 |

* cited by examiner

FIG. 3
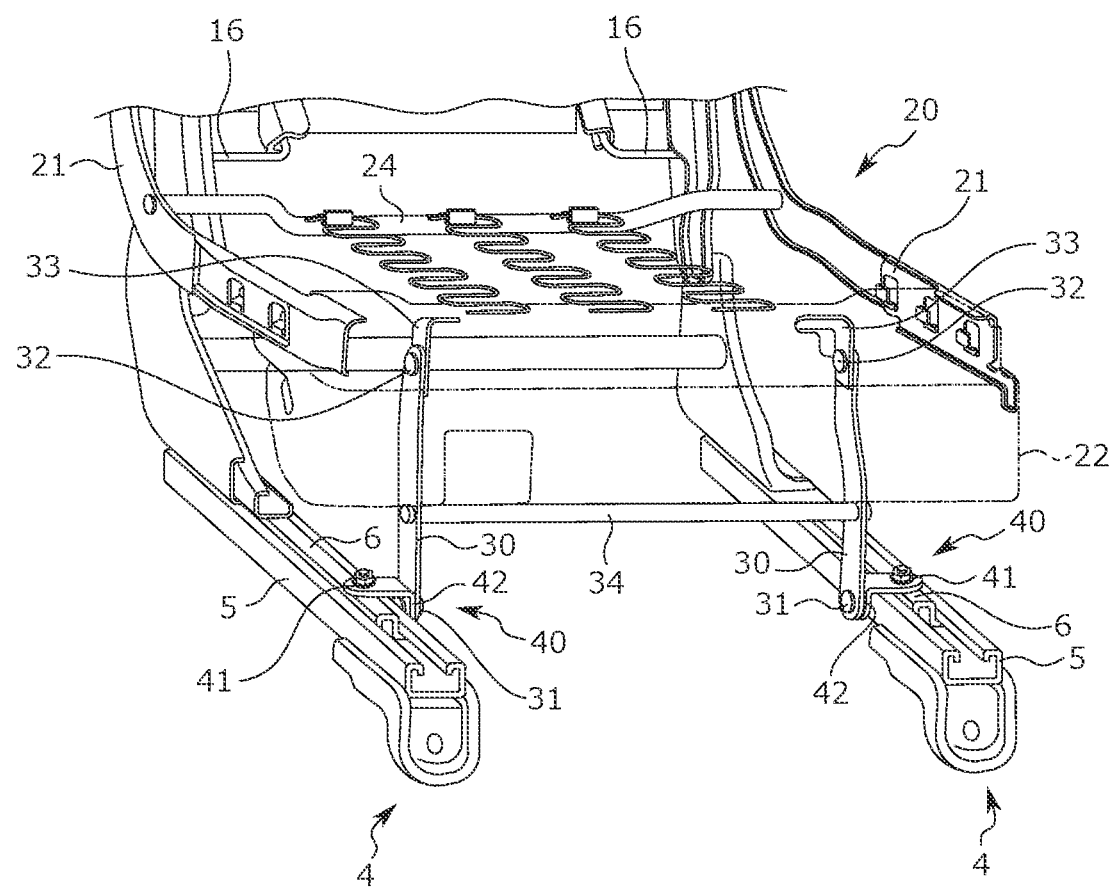
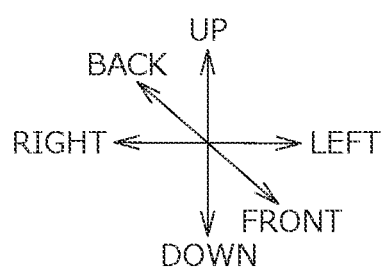

FIG. 8
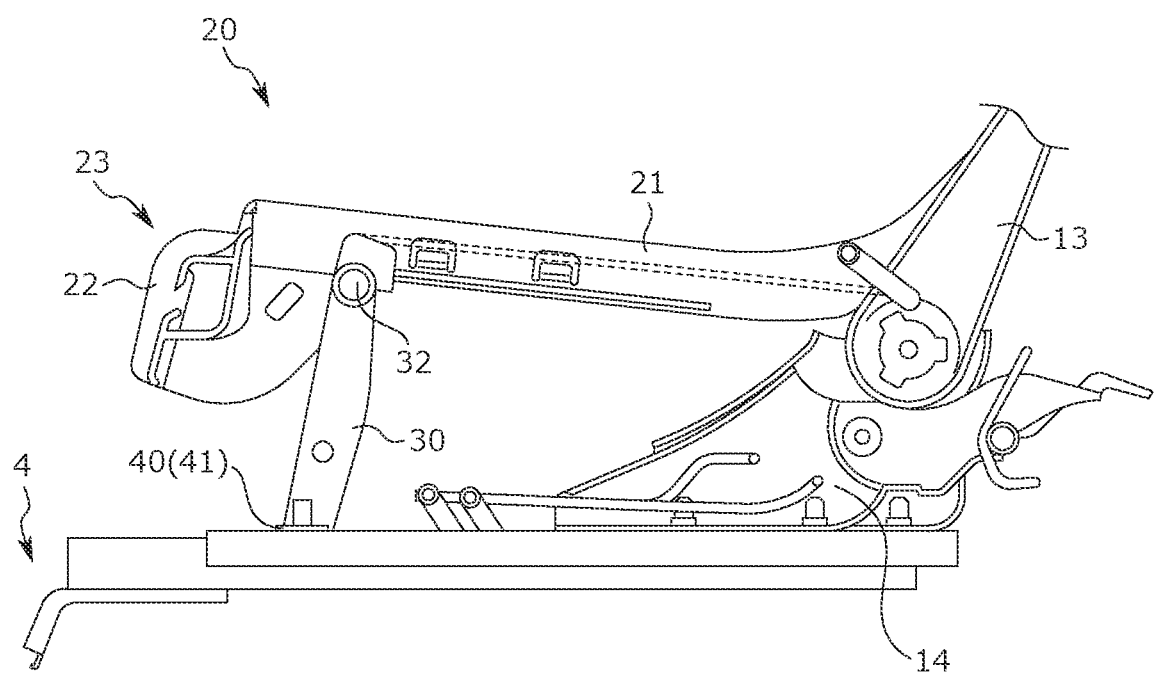
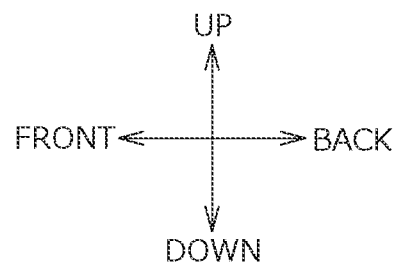

FIG. 9
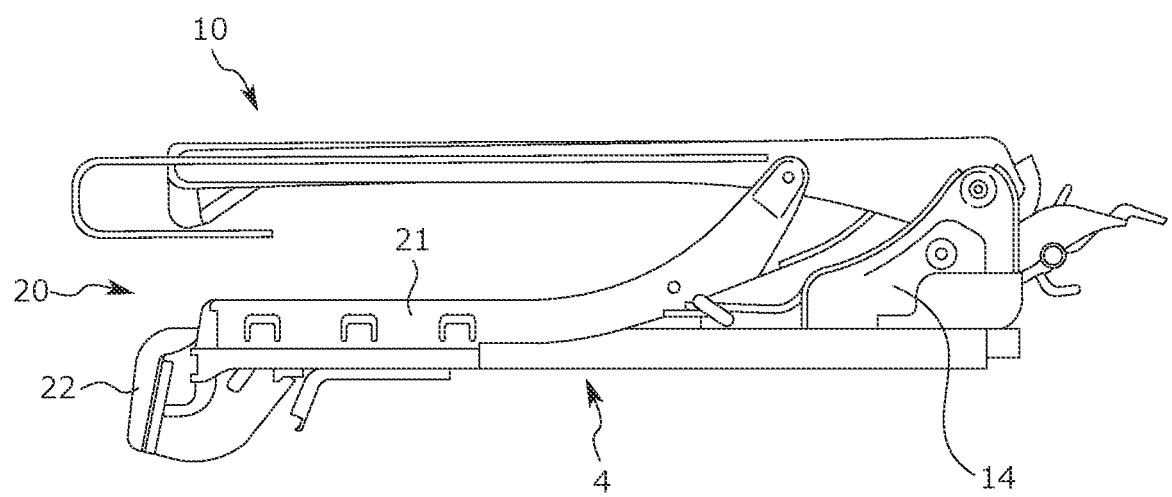
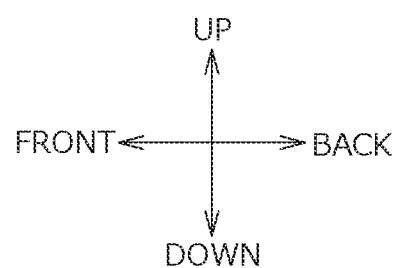

FIG. 12
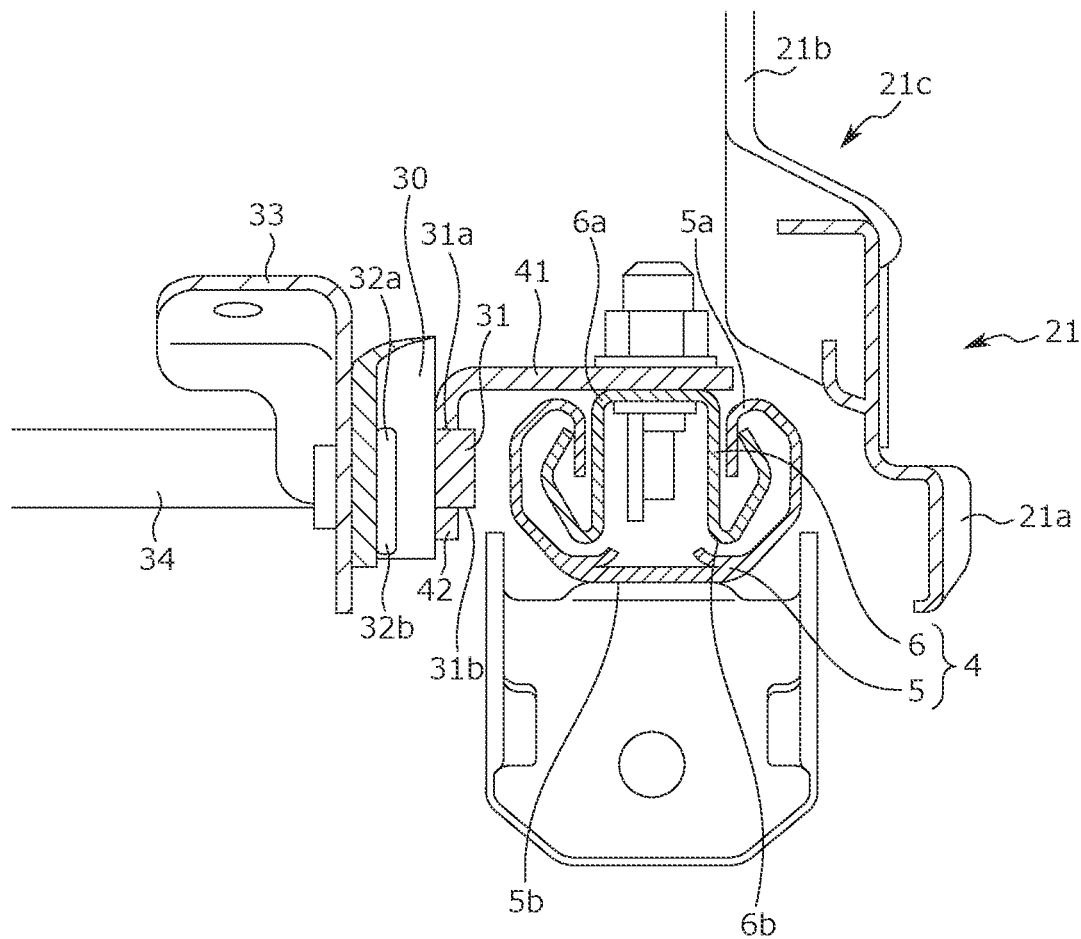
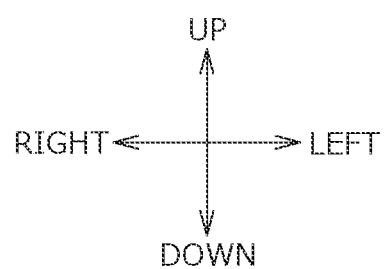

FIG. 15
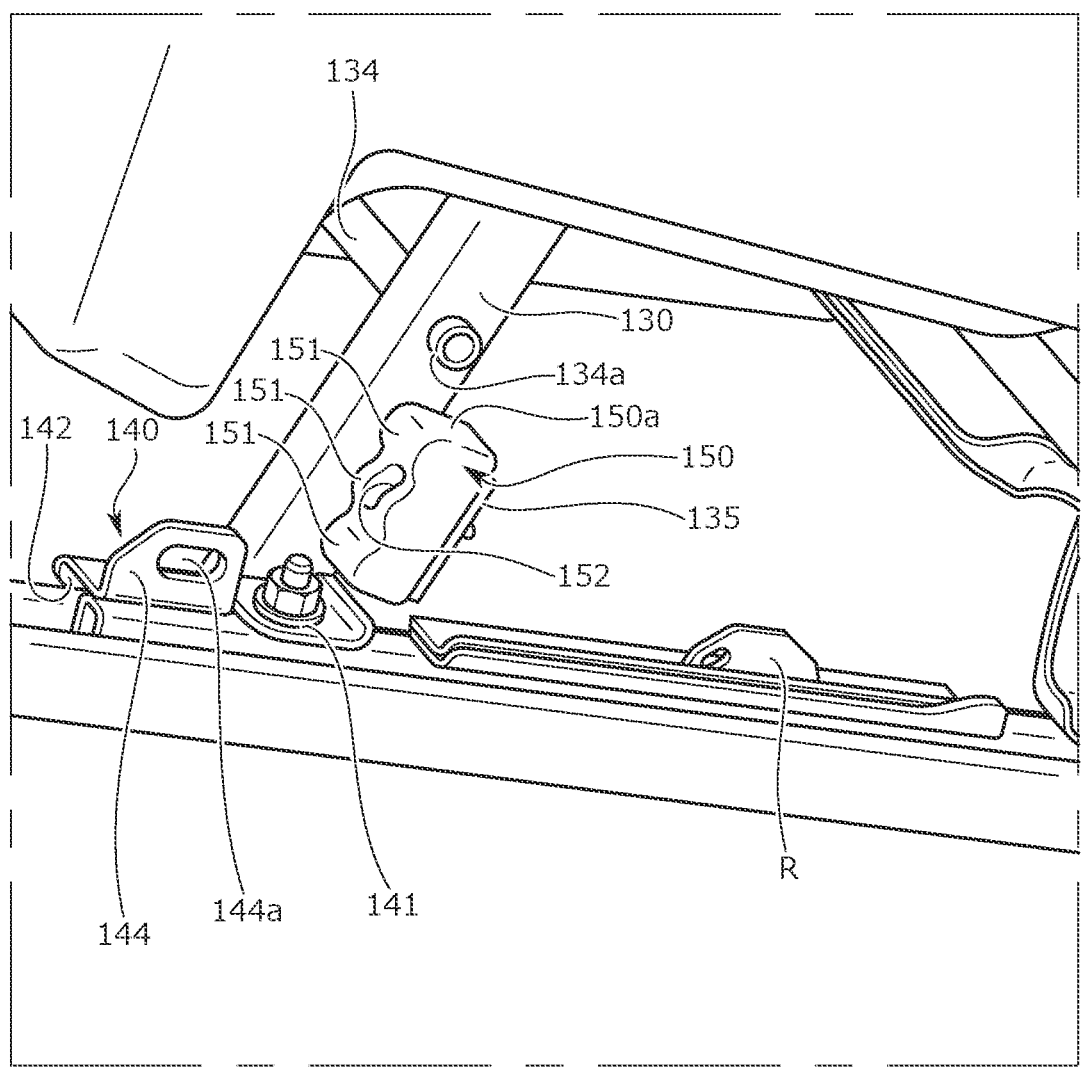
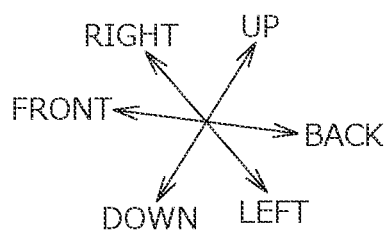

FIG. 16
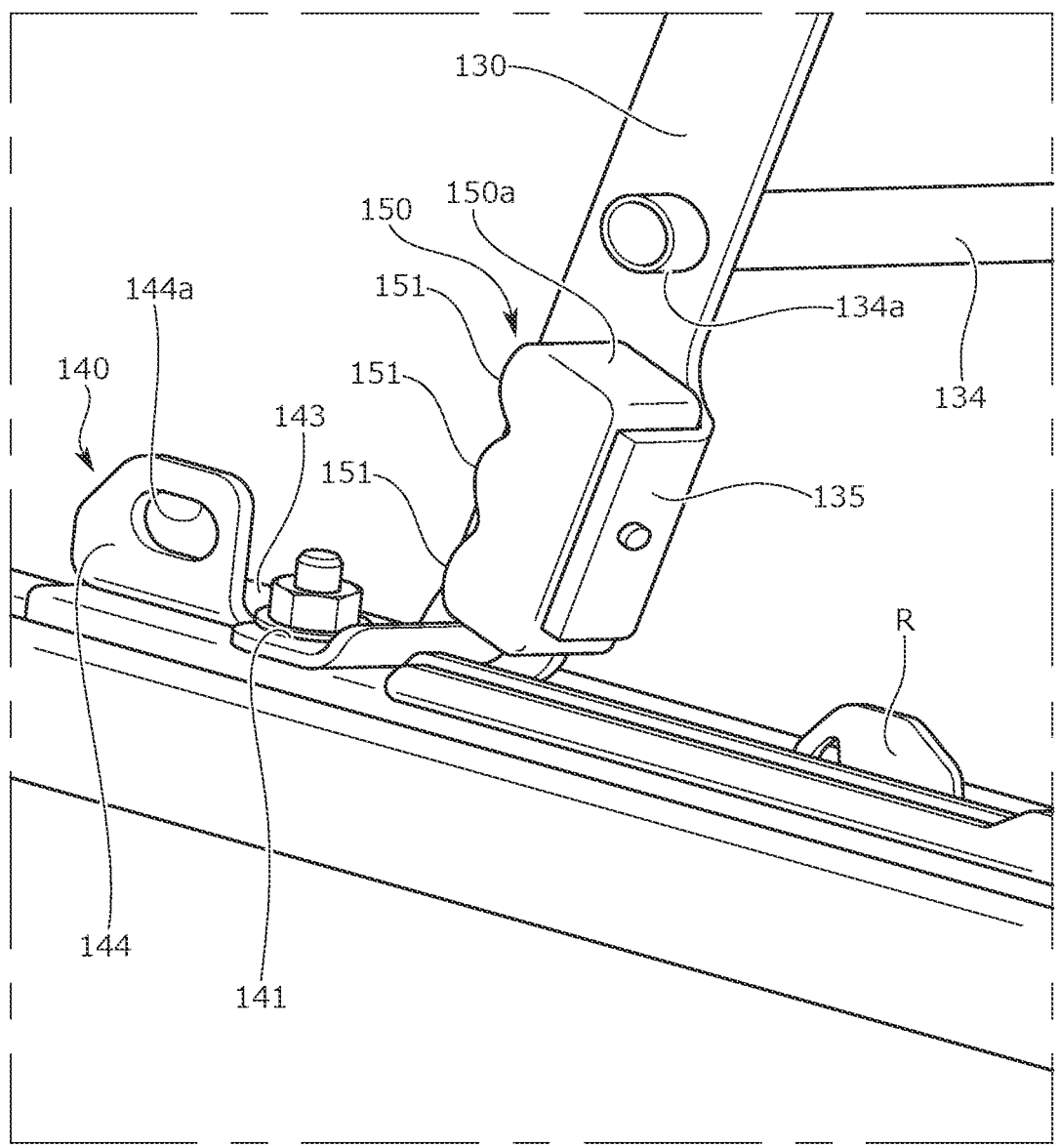
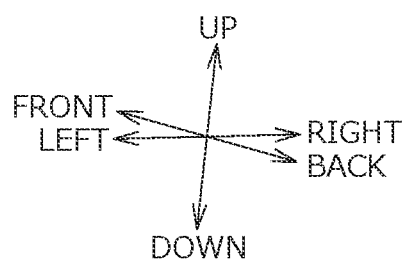

FIG. 19
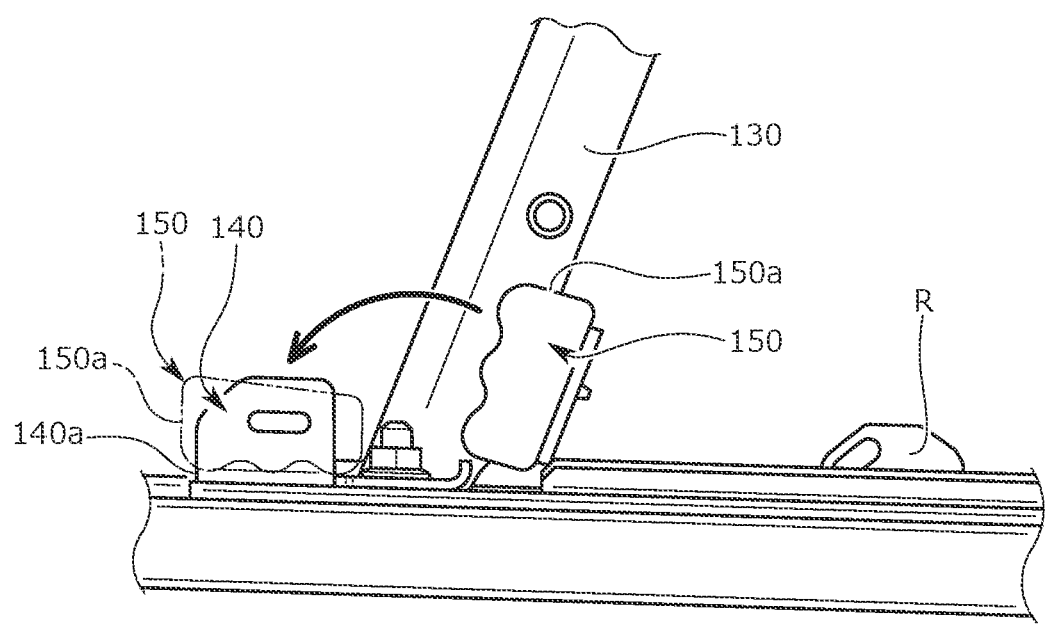
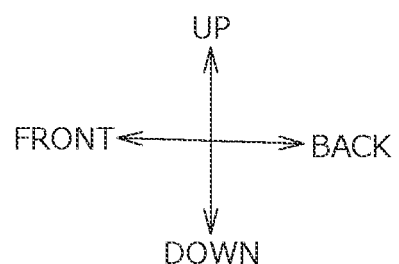

FIG. 23
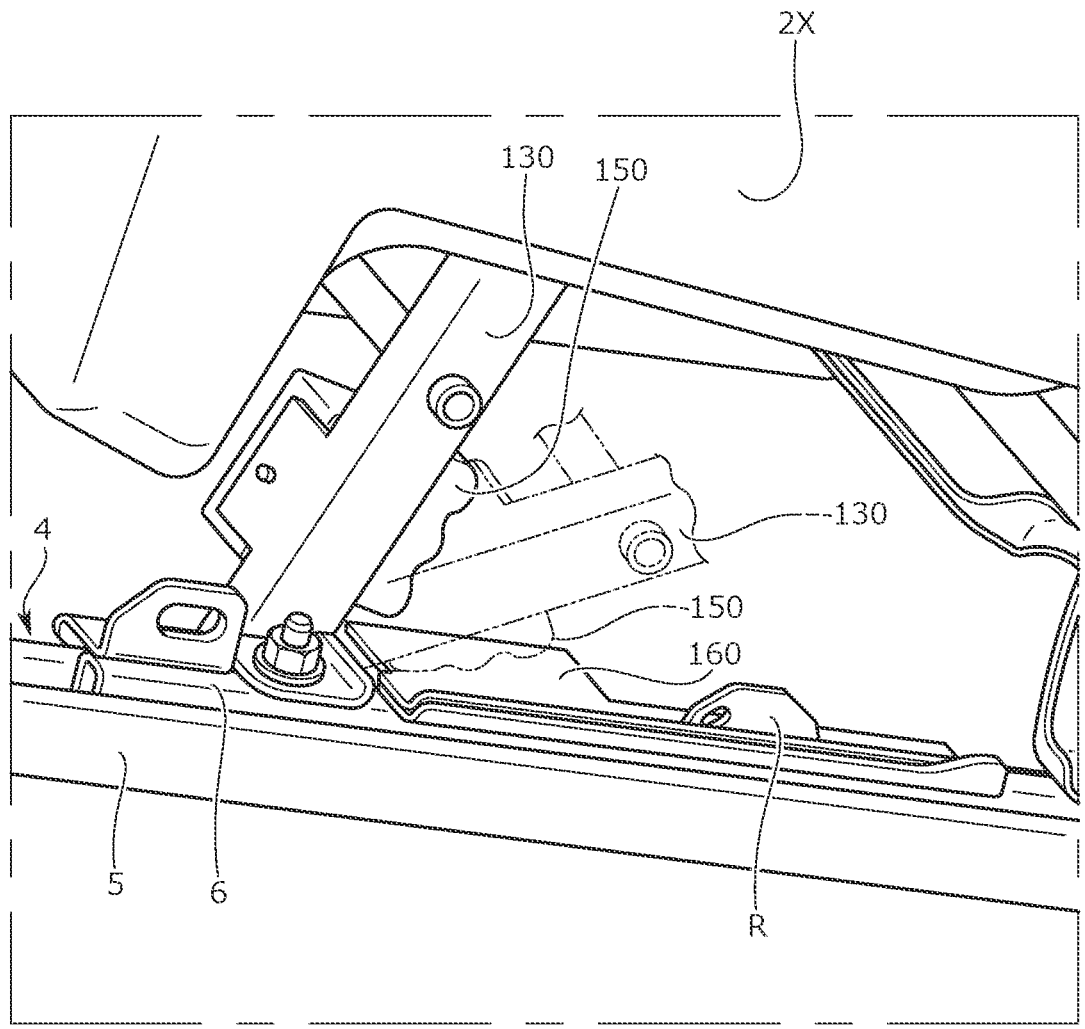
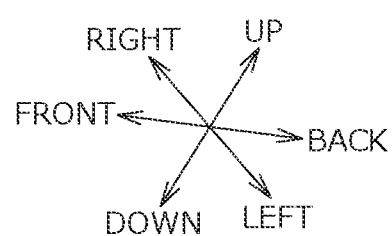

CONVEYANCE SEAT WITH A SLIDE RAIL INCLUDING A LOWER RAIL AND AN UPPER RAIL

CROSS-REFERENCE TO RELATED APPLICATIONS

This application is entering into the national phase of PCT Application No. PCT/JP2019/035410, filed on Sep. 9, 2019. Further, this application claims the benefit of priority from Japanese Application No. 2018-170869, filed on Sep. 12, 2018, the entire contents of which are incorporated herein by reference.

TECHNICAL FIELD

The present invention relates to a conveyance seat and particularly to a conveyance seat capable of moving a seat cushion from a first height position to a second height position below the first height position in an up and down direction of the conveyance seat.

BACKGROUND ART

There is already known a conveyance seat capable of moving a seat cushion from a first height position to a second height position below the first height position in an up and down direction of the conveyance seat. For example, in a conveyance seat of PATENT LITERATURE 1, a seat back falls down as a seat cushion moves from a first height position to a second height position therebelow when shifting a state to a stored state.

CITATION LIST

Patent Literature

PATENT LITERATURE 1: JP 2008-030659 A

SUMMARY OF INVENTION

Technical Problem

In the conveyance seat of PATENT LITERATURE 1, a side frame of a cushion frame is located above an upper end of an upper rail constituting a slide rail mechanism at the second height position. In the conveyance seat of PATENT LITERATURE 1, since the cushion side frame is located above the upper end of the upper rail corresponding to a rail member in a stored state in which the seat cushion moves from the first height position to the second height position therebelow, a size of the conveyance seat in the up and down direction increases.

The present invention has been made in view of the above-described problems and an object thereof is to provide a conveyance seat capable of suppressing an increase in size of a conveyance seat in an up and down direction when a seat cushion moves from a first height position to a second height position therebelow.

Solution to Problem

According to a conveyance seat of the present invention, the problems are solved by a conveyance seat including: a seat back; a seat cushion which includes a pair of cushion side frames extending in a front to back direction of the conveyance seat; a slide rail which includes a lower rail and an upper rail supported to be movable relatively with respect to the lower rail and slides the seat back and the seat cushion in the front to back direction of the conveyance seat; a connecting member that connects the seat cushion and the slide rail to each other; and a first rotation portion which rotatably connects the connecting member to the slide rail, in which the seat cushion is movable from a first height position to a second height position below the first height position in an up and down direction of the conveyance seat, and in which when the seat cushion moves to the second height position, the first rotation portion is disposed at the same height position as the slide rail in a side view of the conveyance seat.

In the conveyance seat of the present invention with the above-described configuration, since the first rotation portion rotatably connecting the connecting member, connecting the seat cushion and the slide rail, to the slide rail is disposed at the same height position as the slide rail when the seat cushion moves from the first height position to the second height position therebelow, an increase in size of the seat in the up and down direction can be suppressed.

In the above-described conveyance seat, a lower end of the first rotation portion may be disposed below an upper end of the upper rail in the up and down direction of the conveyance seat.

In the above-described configuration, since there is no limitation in the connection place for the connecting member and the upper rail, the degree of freedom in design is improved.

In the above-described conveyance seat, the pair of cushion side frames may be connected to each other by a connection member, the conveyance seat may further include a slide lock device which locks a slide movement of the slide rail and a cable member that releases a lock state of the slide lock device, when the seat cushion is located at the first height position, the connection member may be disposed behind the cable member in the front to back direction of the conveyance seat, and when the seat cushion moves to the second height position, the connection member may be disposed in front of the cable member in the front to back direction of the conveyance seat.

In the above-described configuration, the interference between the connection member and the cable member can be suppressed.

In the above-described conveyance seat, the cushion side frame may include a flat portion which is disposed on the outside of the slide rail in a width direction of the conveyance seat and an inclined portion which is disposed at the same height position as the slide rail in the up and down direction of the conveyance seat when the seat cushion moves to the second height position and is inclined upward as it goes backward in the front to back direction of the conveyance seat, a curved portion which is curved inward in the width direction of the conveyance seat may be formed between the flat portion and the inclined portion, and the first rotation portion may be disposed on the inside of the inclined portion and the curved portion in the width direction of the conveyance seat and be disposed below the inclined portion and the curved portion in the up and down direction of the conveyance seat.

In the above-described configuration, the interference between the first rotation portion and the slide rail can be suppressed when the seat cushion moves from the first height position to the second height position.

In the above-described conveyance seat, the connection member may be disposed between the inclined portion and the curved portion, and the connection member may be disposed above the upper end of the first rotation portion and the upper end of the slide rail in the up and down direction of the conveyance seat.

In the above-described configuration, the rigidity of the cushion side frame, particularly, the vicinity of the curved portion is improved and the interference between the connection member and the first rotation portion or the slide rail is suppressed.

In the above-described conveyance seat, the conveyance seat may further include a second rotation portion which rotatably connects the connecting member to the seat cushion and when the seat cushion moves to the second height position, the second rotation portion may be disposed at the same height position as the slide rail in a side view of the conveyance seat.

In the above-described configuration, an increase in size of the seat in the up and down direction can be suppressed.

In the above-described conveyance seat, when the seat cushion moves to the second height position, the first rotation portion and the second rotation portion may be disposed at the same height position as the cushion side frame in a side view of the conveyance seat.

In the above-described configuration, an increase in size of the seat in the up and down direction can be suppressed.

In the above-described conveyance seat, when the seat cushion moves to the second height position, the slide rail may be disposed between the first rotation portion and the cushion side frame and between the second rotation portion and the cushion side frame in a width direction of the conveyance seat.

In the above-described configuration, the interference between the cushion side frame and the connecting member is suppressed.

In the above-described conveyance seat, when the seat cushion moves to the second height position, a lower end of the second rotation portion may be disposed below a lower end of the upper rail and be disposed below a lower end of the first rotation portion in the up and down direction of the conveyance seat.

In the above-described configuration, an increase in size of the seat in the up and down direction can be suppressed.

In the above-described conveyance seat, the seat cushion may include a seat cushion frame, a step portion may be formed at a front end of the seat cushion frame, and when the seat cushion moves to the second height position, a lower end of the first rotation portion and a lower end of the second rotation portion may be disposed below a lower end of the step portion in the up and down direction of the conveyance seat.

In the above-described configuration, the interference of the first rotation portion and the second rotation portion with respect to a pan frame of the seat cushion frame is suppressed when the seat cushion moves from the first height position to the second height position.

Advantageous Effects of Invention

According to the conveyance seat of the present invention, since the first rotation portion rotatably connecting the connecting member, connecting the seat cushion and the slide rail, to the slide rail is disposed at the same height position as the slide rail when the seat cushion moves from the first height position to the second height position therebelow, an increase in size of the seat in the up and down direction can be suppressed.

Further, according to the conveyance seat of the present invention, since there is no limitation in the connection place for the connecting member and the upper rail, the degree of freedom in design is improved.

Further, according to the conveyance seat of the present invention, the interference between the connection member and the cable member can be suppressed.

Further, according to the conveyance seat of the present invention, the interference between the first rotation portion and the slide rail can be suppressed when the seat cushion moves from the first height position to the second height position.

Further, according to the conveyance seat of the present invention, the rigidity of the cushion side frame, particularly, the vicinity of the curved portion is improved and the interference between the connection member and the first rotation portion or the slide rail is suppressed.

Further, according to the conveyance seat of the present invention, an increase in size of the seat in the up and down direction can be suppressed.

Further, according to the conveyance seat of the present invention, an increase in size of the seat in the up and down direction can be suppressed.

Further, according to the conveyance seat of the present invention, the interference between the cushion side frame and the connecting member is suppressed.

Further, according to the conveyance seat of the present invention, an increase in size of the seat in the up and down direction can be suppressed.

Further, according to the conveyance seat of the present invention, the interference of the first rotation portion and the second rotation portion with respect to the pan frame of the seat cushion frame is suppressed when the seat cushion moves from the first height position to the second height position.

BRIEF DESCRIPTION OF DRAWINGS

FIG. 3 is a diagram illustrating a seat cushion frame and a slide rail in which a pan frame is indicated by a virtual line.

FIG. 8 is a side view of the seat cushion frame when the seat state is a seated state.

FIG. 9 is a side view of the seat frame when the seat state is a stored state.

FIG. 12 is a cross-sectional view taken along a line A-A of FIG. 10 and is an explanatory diagram illustrating a structure around the slide rail when the seat state is a stored state.

FIG. 15 is an explanatory diagram illustrating a structure around a rail connection bracket when the seat state is a seated state.

FIG. 16 is an explanatory diagram illustrating a structure around the rail connection bracket when the seat state is a seated state.

FIG. 19 is a schematic diagram illustrating a position of a rubber damper when the seat state moves from the seated state to the stored state.

FIG. 23 is a schematic diagram illustrating a position of a rubber damper when the seat state moves from a seated state to a stored state.

DESCRIPTION OF EMBODIMENTS

Hereinafter, a configuration of a conveyance seat according to an embodiment of the present invention will be described with reference to the drawings. However, the embodiment described below is for facilitating the understanding of the present invention and do not limit the present invention. That is, the present invention can be modified and improved without departing from the gist thereof and the present invention, of course, includes an equivalent thereof.

Further, in the description below, the contents relating to the material, shape, and size of the seat components are merely specific example and do not limit the present invention.

Hereinafter, a vehicle seat mounted on a vehicle will be described as an example of the conveyance seat and a configuration example thereof will be described. However, the present invention is not limited to vehicle seats mounted on taxiing vehicles having wheels such as automobiles and trains and can be also applied to, for example, seats mounted on aircraft and ships moving outside the ground.

Further, in the description below, the "front to back direction" is the front to back direction of the vehicle seat (in other words, the front to back direction of the seat body) and is the direction matching the traveling direction when the vehicle runs. Further, the "seat width direction" is the width direction of the vehicle seat (in other words, the width direction of the seat body) and is the direction matching the right and left direction seen from an occupant seated on the vehicle seat. Further, the "up and down direction" is the up and down direction of the vehicle seat and is the direction matching the vertical direction when the vehicle runs on a horizontal plane.

Further, the "outside of the vehicle" in the seat width direction means the side closer to the outside of the vehicle body (for easy understanding, the side closer to the near door) and the "inside of the vehicle" means the side closer to the inside of the vehicle body (for easy understanding, the side away from the near door).

Further, in the description below, "rotation" means a rotation operation about an axis along the seat width direction unless otherwise specified.

Additionally, the shape, position, posture, and the like of each portion of the vehicle seat to be described below will be described on the assumption that the vehicle seat is in a seated state to be described later unless otherwise specified.

<Vehicle Seat S>

Figure 1:
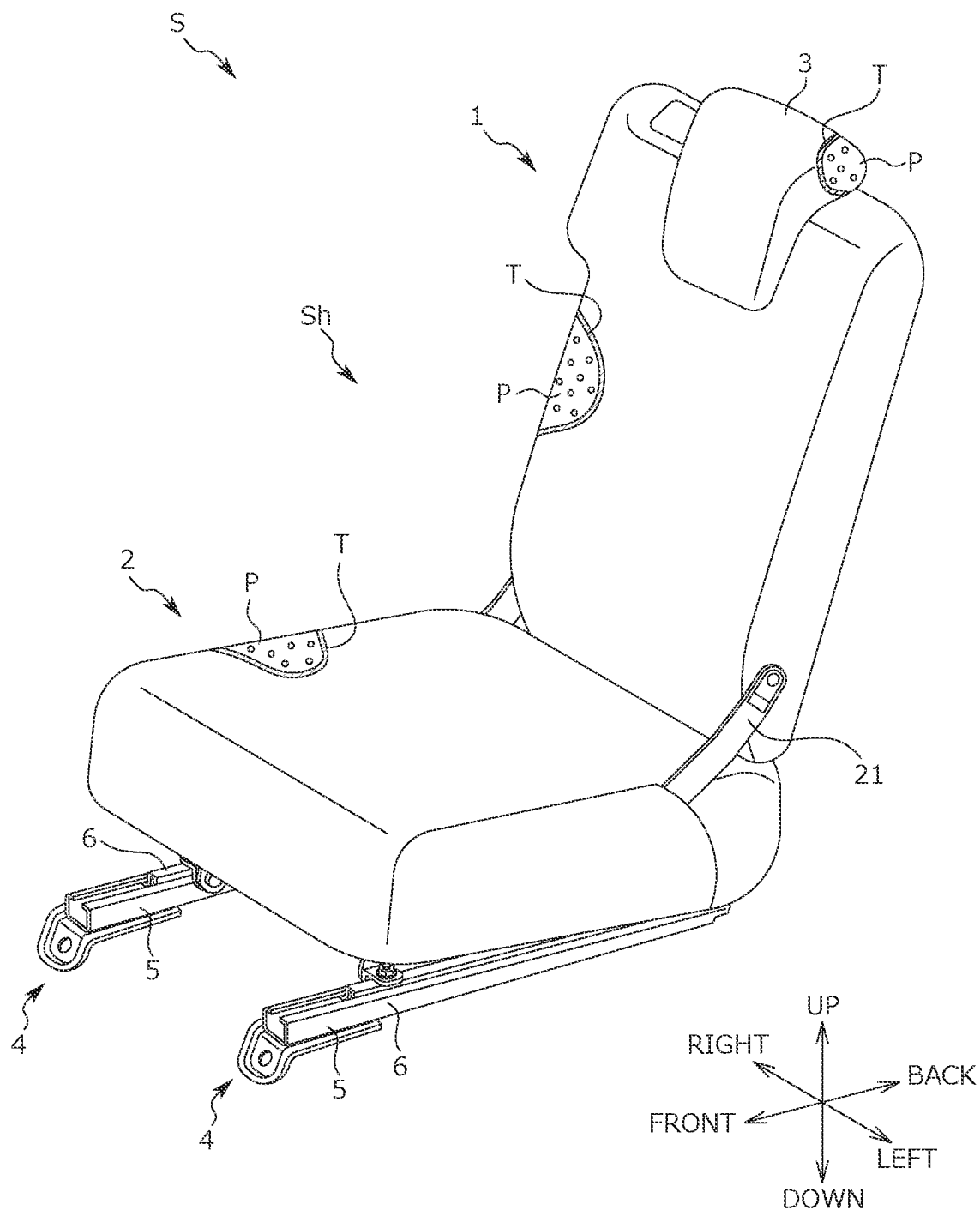
FIG. 1 is a perspective view of a vehicle seat according to an embodiment of the present invention.

A basic configuration of a vehicle seat (hereinafter, a vehicle seat S) according to this embodiment will be described with reference to FIG. 1. FIG. 1 is a perspective view of the vehicle seat S. For convenience of illustration, a part of the vehicle seat S in FIG. 1 is illustrated with a trim cover T removed.

The vehicle seat S is a seat which is placed on a vehicle body floor and on which an occupant of the vehicle is seated. In this embodiment, the vehicle seat S is used as a rear seat corresponding to the rear seat of the vehicle. However, the present invention is not limited thereto and the vehicle seat S can also be used as a second-row middle seat or a third-row rear seat in a vehicle having three rows of seats in the front to back direction.

The vehicle seat S includes a seat body Sh which forms a main body portion thereof as illustrated in FIG. 1. As illustrated in FIG. 1, the seat body Sh includes a seat back 1 which is a backrest supporting the back of the seated occupant, a seat cushion 2 which is a seating portion supporting the buttocks of the seated occupant, and a headrest 3 which is disposed on the upper portion of the seat back 1 and supports the head of the seated occupant as main components. The seat back 1 is rotatably attached to the vehicle body floor via a rear bracket 14 to be described later.

Figure 2:
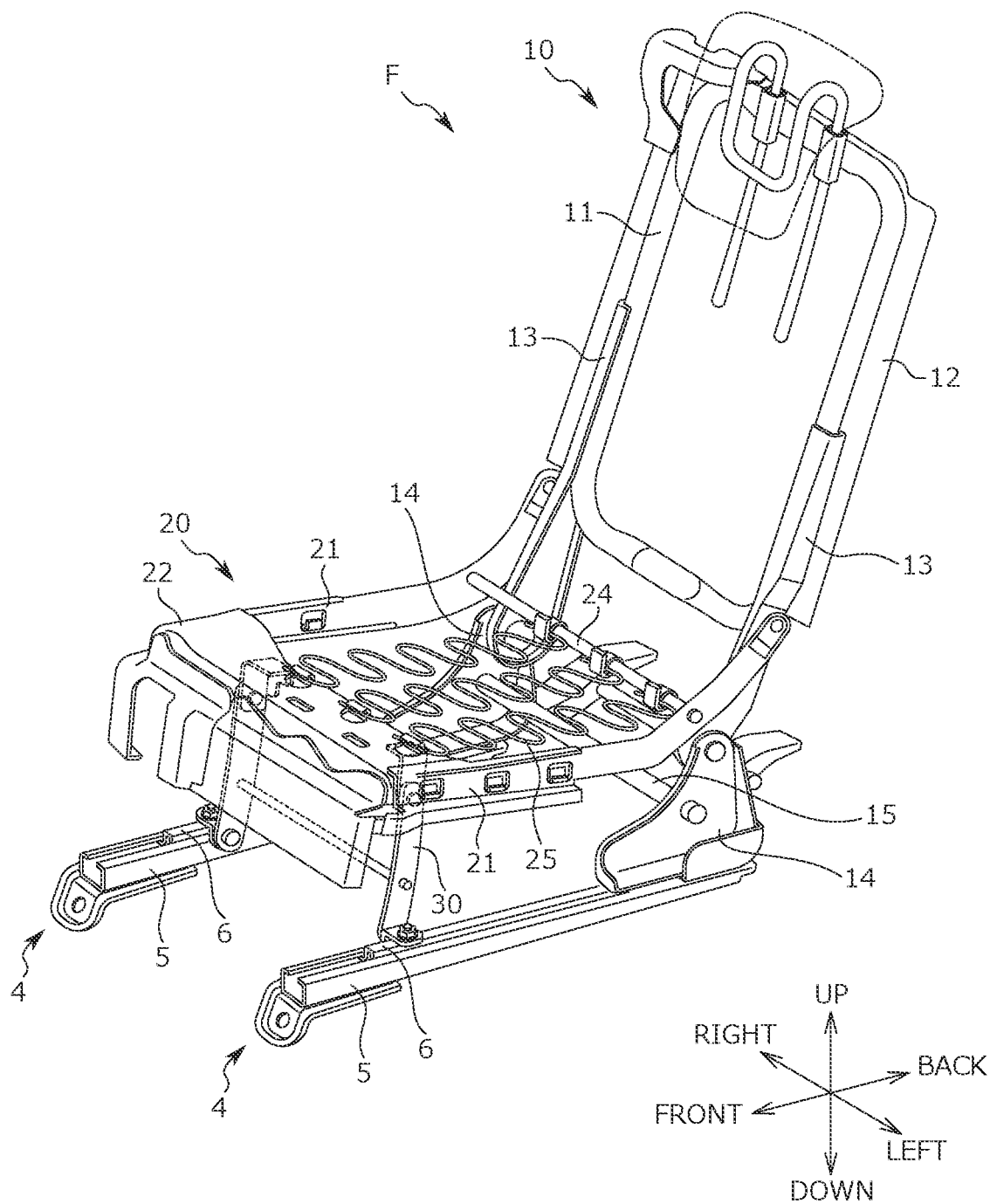
FIG. 2 is a perspective view of a seat frame included in the vehicle seat.

A seat frame F illustrated in FIG. 2 is provided in the vehicle seat S. The seat frame F includes a seat back frame 10 which is a frame of the seat back 1 and a seat cushion frame 20 which is a frame of the seat cushion 2. The seat back frame 10 and the seat cushion frame 20 are connected to each other via a reclining mechanism (not illustrated). The seat back 1 and the seat cushion 2 are configured by providing a pad member P and the trim cover T on the outside of the seat back frame 10 and the seat cushion frame 20. The pad member P is a urethane base material molded by foam molding using, for example, a urethane foam material and the trim cover T is made of a material such as cloth or leather.

Further, the rear end portion of the seat cushion 2 is connected to the side portion of the seat back 1. Additionally, as illustrated in FIG. 1, a cushion side frame 21 to be described later is interposed between the rear end portion of the seat cushion 2 and the lower end portion of the seat back 1. This cushion side frame 21 is rotatably attached to the seat back 1. Accordingly, the seat cushion 2 is rotatable together with the seat back 1.

Further, a slide rail 4 to be described later is installed in the lower portion of the seat body Sh. By this slide rail 4, the seat body Sh is attached to the vehicle body floor to be slidable in the front to back direction.

Further, the seat body Sh can be stored in a folded state on a storage floor formed in front of the seat body Sh. The storage floor is a concave space which is formed by depressing a part of the vehicle body floor (specifically, a portion located in front of the seat body Sh in the vehicle body floor when the seat body Sh is in the seated state) downward.

<Seat Frame F>

Figure 4:
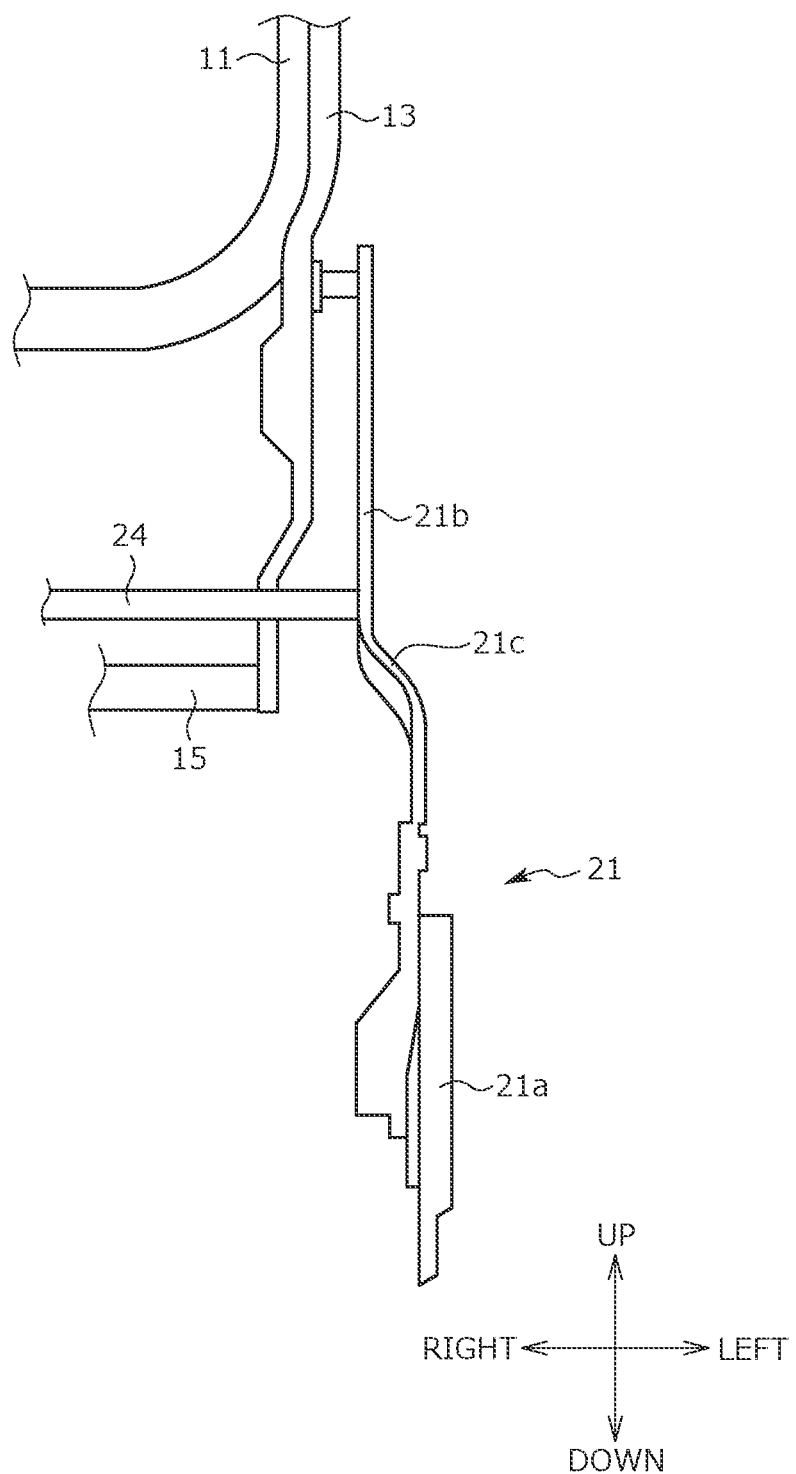
FIG. 4 is a front view of the seat frame and is an enlarged view for describing a shape of a cushion side frame.
Figure 5:
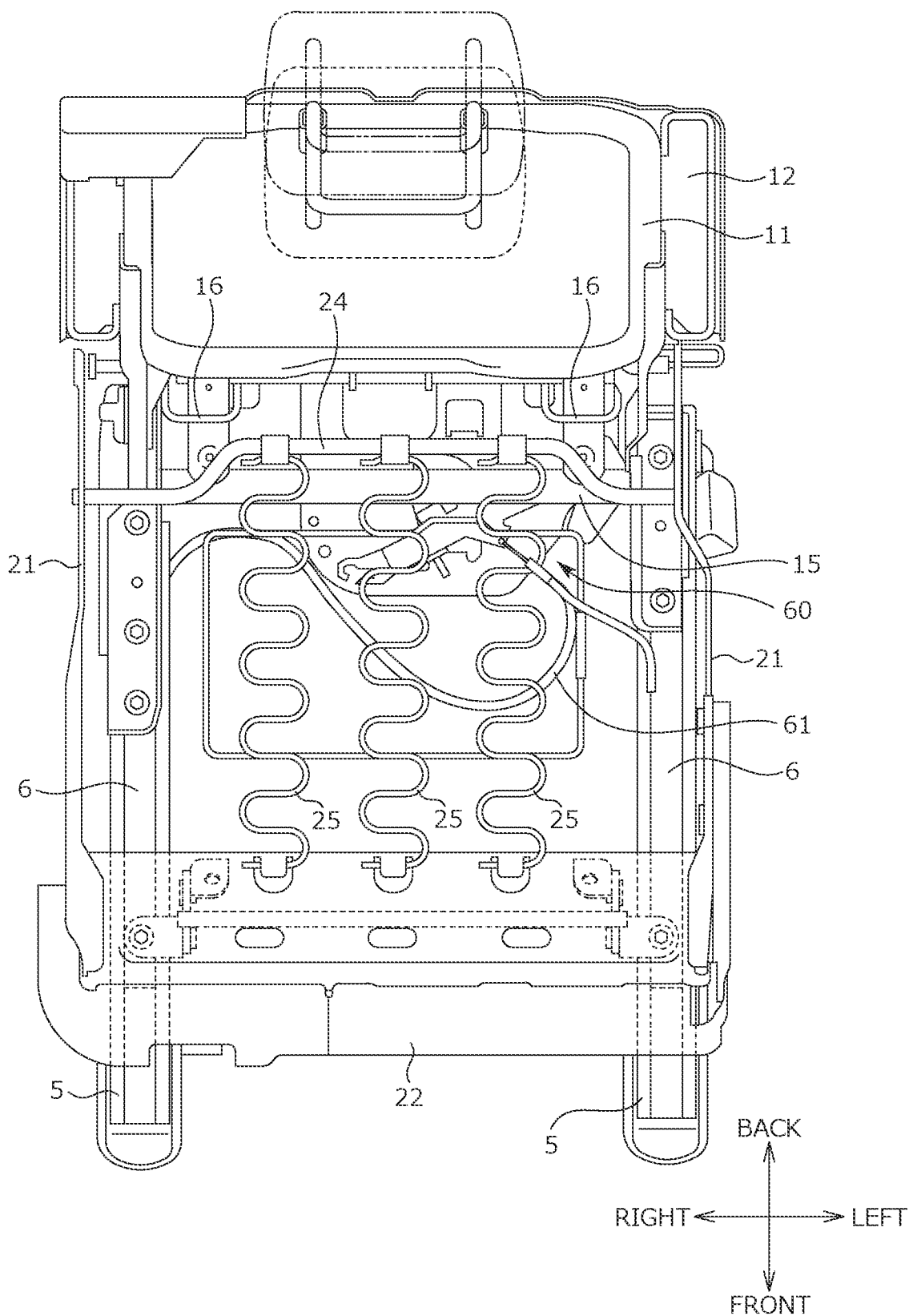
FIG. 5 is a top view of the seat frame.
Figure 6:
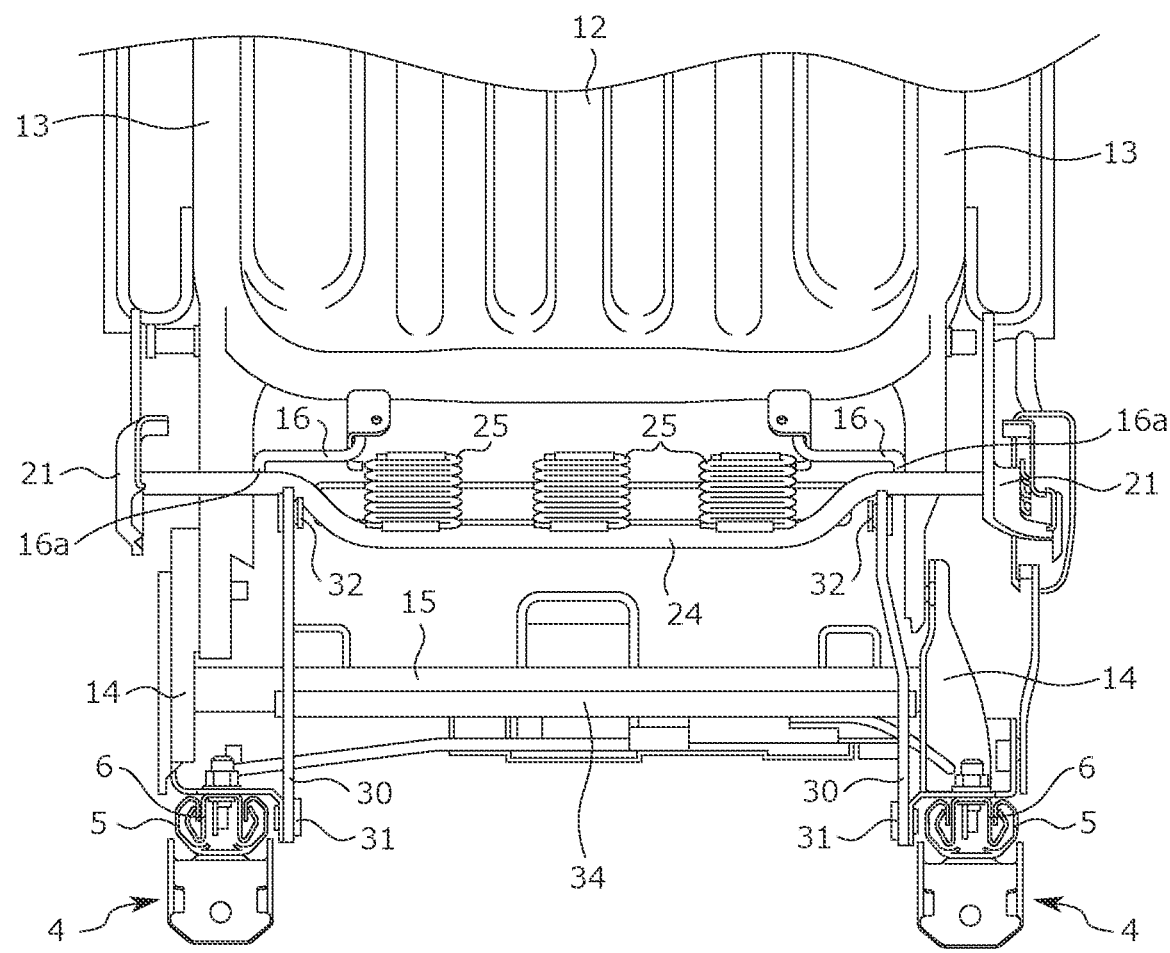
FIG. 6 is a front view of the seat frame in a state in which the pan frame is not displayed.

A basic configuration of the seat frame F (hereinafter, the seat frame F) according to this embodiment will be described with reference to FIGS. 2 to 6. FIG. 2 is a perspective view of the seat frame F included in the vehicle seat S. FIG. 3 is a diagram illustrating the seat cushion frame 20 and the slide rail 4 in which a pan frame 22 is indicated by a virtual line. FIG. 4 is a front view of the seat frame F and is an enlarged view for describing a shape of the cushion side frame 21. FIG. 5 is a top view of the seat frame F. FIG. 6 is a front view of the seat frame F in a state in which the pan frame 22 is not displayed.

As illustrated in FIG. 2, the seat frame F includes the seat back frame 10 which forms a skeleton of the backrest in the seat frame F and the seat cushion frame 20 which forms a skeleton of the seating portion in the seat frame F as main components.

(Seat Back Frame 10)

First, a configuration of the seat back frame 10 will be described. As illustrated in FIG. 2, the seat back frame 10 mainly includes a pipe frame 11 which is made of a pipe processed into a square frame shape, a back panel 12, and a back side frame 13.

The back panel 12 is a plate-shaped frame that is provided in the rear portion of the pipe frame 11. The back panel 12 extends from the pipe frame 11 to the outside in a front view. That is, the outer edge of the back panel 12 is located on the outside of the pipe frame 11.

The back side frame 13 is a frame which is attached to each of the right and left side portions of the pipe frame 11 and extends in the up and down direction. In other words, the back side frame 13 is a frame which is disposed on the outside of the seat in the pipe frame 11 and constitutes the right and left end portions of the seat back frame 10 together with the side portion of the pipe frame 11. The back side frame 13 is a U-shaped frame which opens to the inside of the seat in cross-section. In the back side frame 13, the upper portion is welded to the center portion of the side portion of the pipe frame 11 and the lower portion is rotatably attached to the rear bracket 14. The upper portion of the rear bracket 14 is connected to the back side frame 13. Further, the lower portion of the rear bracket 14 is connected to an upper rail 6 of the slide rail.

The slide rail 4 is a device for sliding the seat body Sh in the front to back direction and has a known structure (a structure of a general slide rail mechanism). The slide rail 4 includes a pair of lower rails 5 which is fixed onto the vehicle body floor and a pair of upper rails 6 which is slidable with respect to the lower rails 5. The upper rail 6 is slidable with respect to the lower rail 5 fixed to the vehicle body. Then, the seat back frame 10 and the seat cushion frame 20 are attached to the upper rail 6 and are movable forward and backward with respect to the lower rail 5 together with the upper rail 6. Thus, the seat body Sh attached to the upper rail 6 moves forward and backward with the slide movement of the upper rail 6.

Additionally, the upper rail 6 is normally locked by a slide lock device 60 so as not to be slidable and is in a slidable state when the occupant performs a predetermined manipulation to release the lock state. More specifically, a manipulation member (not illustrated) is connected to the slide lock device 60 via a cable member 61. Since the slide lock device 60 uses a general device for locking the upper rail 6, a detailed description thereof will be omitted. Then, when the manipulation member is manipulated, the cable member 61 is pulled, so that a slide lock mechanism is operated to release the lock of the upper rail 6.

Next, a wire 16 attached to the pipe frame 11 and the back side frame 13 will be described. Additionally, the wire 16 is a metallic linear member. As illustrated in FIG. 2, the wire 16 which connects the lower portion of the pipe frame 11 and the back side frame 13 is provided at each of the right and left sides of the seat frame F. The wire 16 includes a horizontal extension portion extending in the right and left direction of the seat between the connecting portions of the lower portion of the pipe frame 11 and the back side frame 13. This horizontal extension portion functions as a lower anchorage for fixing a child seat.

(Seat Cushion Frame 20)

Next, a configuration of the seat cushion frame 20 will be described. As illustrated in FIG. 2, the seat cushion frame 20 mainly includes the cushion side frames 21 which are disposed on the right and left sides, the pan frame 22, and a connection pipe 24.

The cushion side frame 21 is a frame which extends in the front to back direction of the seat. The pan frame 22 is connected to the front end portions of the right and left cushion side frames 21. The pan frame 22 is a substantially rectangular plate-shaped frame which supports the thighs of the occupant. A step portion 23 is formed at the front end portion of the pan frame 22.

The connection pipe 24 is erected in the middle portion of the right and left cushion side frames 21. Further, the rear end portions of the right and left cushion side frames 21 are rotatably connected to the back side frame 13 of the seat back frame 10.

As illustrated in FIG. 2, a pressure receiving member 25 which is an S spring is disposed to extend in the front to back direction of the seat. Specifically, the front end portion of the pressure receiving member 25 is attached to the pan frame 22 and the rear end portion of the pressure receiving member 25 is attached to the connection pipe 24.

As illustrated in FIGS. 2 to 5, the cushion side frame 21 includes a flat portion 21a which is disposed on the outside of the slide rail 4 in the seat width direction and an inclined portion 21b which is inclined upward as it goes backward in the front to back direction of the seat and a curved portion 21c which is curved inward in the seat width direction is formed between the flat portion 21a and the inclined portion 21b.

As illustrated in FIGS. 2, 3, and 6, the seat cushion 2 and the slide rail 4 are connected to each other by a connecting link 30 which is a connecting member. More specifically, the pan frame 22 of the seat cushion frame 20 is connected to the connecting link 30 via a cushion connecting bracket 33 and the upper rail 6 of the slide rail 4 is connected to the connecting link via a rail connection bracket 40, so that the seat cushion 2 and the slide rail 4 are connected to each other by the connecting link 30. A pair of the connecting links 30 is provided in the seat width direction to be separated from each other and the pair of connecting links 30 are connected in the seat width direction by a connecting link connection member 34. The operations of the pair of connecting links 30 are interlocked to each other by the connecting link connection member 34.

Additionally, since a configuration around the connecting link 30 is bilaterally symmetrical and substantially the same, the configuration around the connecting link 30 on the left side of the seat will be described below with reference to the drawings. One end of the connecting link 30 is attached to the upper rail 6 of the slide rail 4 by a first rotation member 31 which is a first rotation portion via the rail connection bracket 40 and the other end of the connecting link 30 is attached to the pan frame 22 by a second rotation member 32 which is a second rotation portion via the cushion connecting bracket 33.

The rail connection bracket 40 includes a rail fixing portion 41 which is fixed to the upper surface of the upper rail 6 of the slide rail 4 and a rotation shaft attachment portion 42 which is bent downward by about 90° from the rail fixing portion 41 and is disposed on the inside of the lower rail 5 in the seat width direction. As illustrated in FIGS. 3 and 6, the connecting link 30 is attached to the rotation shaft attachment portion 42 by the first rotation member 31.

As illustrated in FIG. 6, a lower end 16a of the wire 16 which connects the pipe frame 11 and the back side frame 13 at the lower end of the seat back frame 10 is disposed above a lower end 24a of the connection pipe 24 in the up and down direction of the seat. According to such a configuration, the interference between the wire 16 and the connection pipe 24 is suppressed.

<Change in Seat State>

Figure 7:
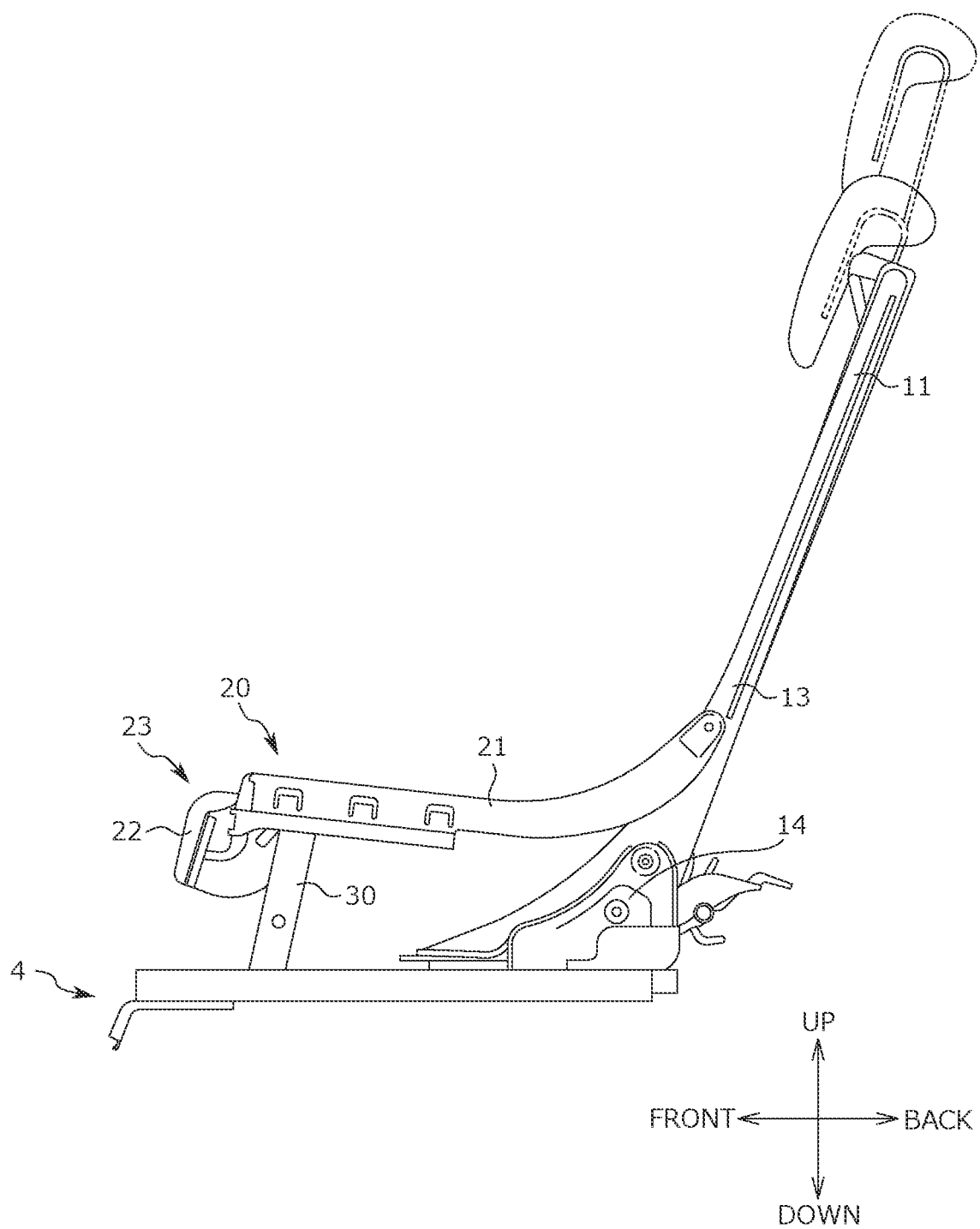
FIG. 7 is a side view of the seat frame when a seat state is a seated state.

Hereinafter, a change in the seat state will be described with reference to FIGS. 7 to 9. FIGS. 7 to 9 are side views of the seat frame F and FIGS. 7 and 8 are diagrams when the seat state is a seated state. FIG. 9 is a side view of the seat frame F when the seat state is a stored state.

In this embodiment, the seat state can be switched between the seatable state illustrated in FIGS. 7 and 8 and the stored state illustrated in FIG. 9. The seated state is a state in which the seat back 1 stands up against the vehicle body floor and an occupant corresponding to the seated occupant can be seated on the seat cushion 2. When the seat state is the seatable state, as illustrated in FIG. 1, the seat back 1 is slightly inclined backward and the seat cushion 2 takes a posture in which the seat surface (the surface on which the occupant's buttocks and thighs are placed) faces upward.

The stored state is a state in which the seat body Sh is stored in a folded state. When the seat body Sh shifts to the stored state, the seat back 1 (the seat back frame 10) falls forward with respect to the vehicle body floor and the seat cushion 2 (the seat cushion frame 20) moves downward. Then, the seat back frame 10 and the seat cushion frame 20 are folded substantially in parallel in a side view.

Hereinafter, the height position of the seat cushion 2 when the seat state is the seated state is defined as a first height position and the height position of the seat cushion 2 when the seat state is the stored state is defined as a second height position. That is, when the seat state shifts the stored state from the seated state, the height position of the seat cushion 2 moves from the first height position to the second height position below the first height position.

Next, a motion of the seat frame F when switching the seat state will be described. When the seat state is the seated state, the seat back 1 is in an erected posture with respect to the vehicle body floor and the seat cushion 2 is in a substantially horizontal posture with respect to the vehicle body floor.

When switching the seat state from the seated state to the stored state, the seat back frame 10 (the seat back 1) rotates with respect to the vehicle body floor to fall forward. Further, the seat cushion frame 20 (the seat cushion 2) moves downward while moving forward in accordance with the operation in which the seat back frame 10 (the seat back 1) falls forward. Then, the seat state reaches the stored state at a time point at which the seat back frame 10 (the seat back 1) overlaps the seat cushion frame 20 (the seat cushion 2) due to the further forward falling operation of the seat back frame 10 (the seat back 1).

<Configuration of Seat Frame F in Stored State>

Figure 10:
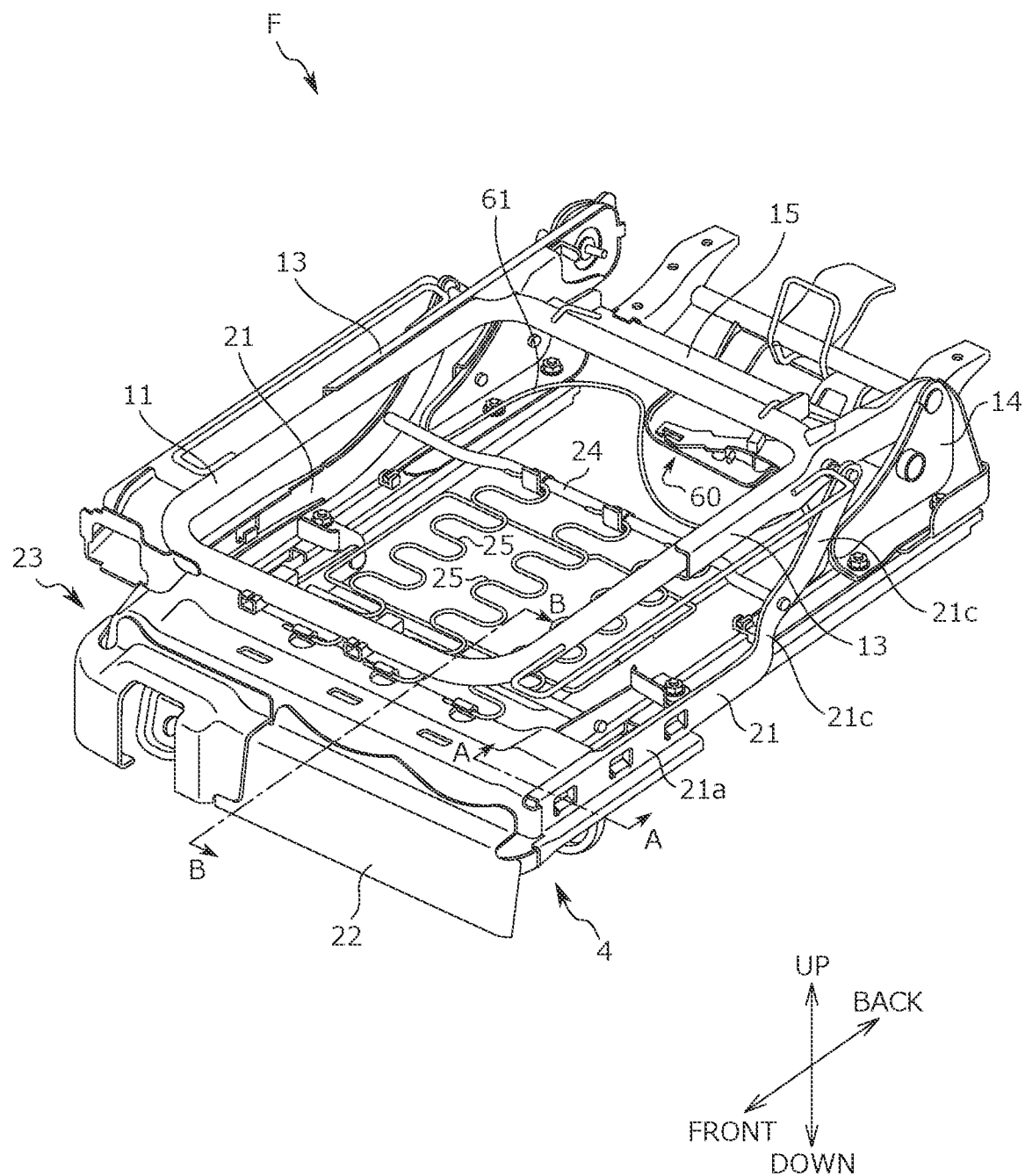
FIG. 10 is a perspective view of the seat frame when the seat state is a stored state.
Figure 11:
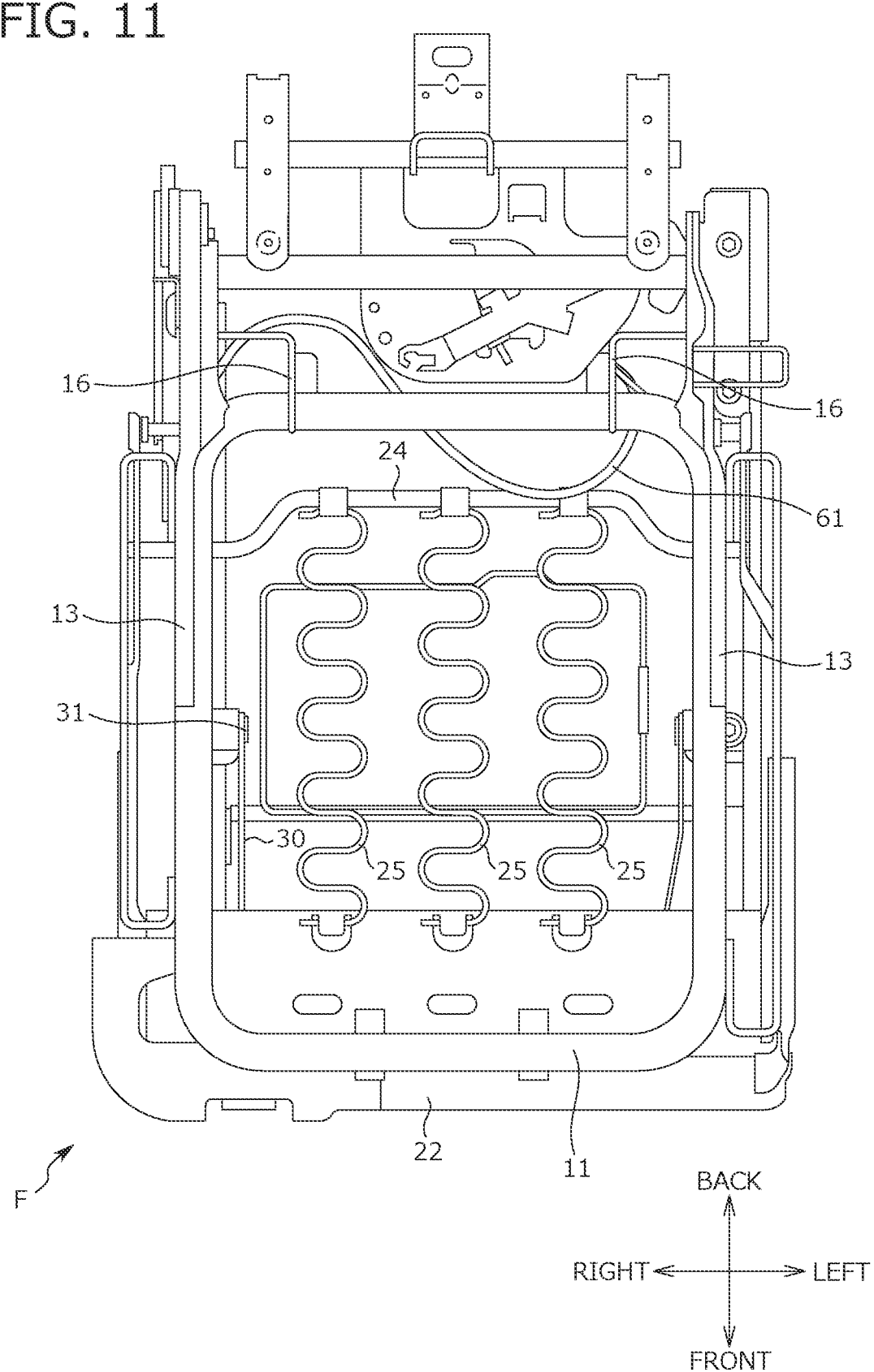
FIG. 11 is a top view of the seat frame when the seat state is a stored state.

Hereinafter, a configuration of the seat frame F when the seat state is the stored state (in other words, when the seat cushion 2 is located at the second height position) will be described with reference to FIGS. 10 to 13. FIG. 10 is a perspective view of the seat frame when the seat state is the stored state and FIG. 11 is a top view of the seat frame when the seat state is the stored state. FIG. 12 is a cross-sectional view taken along a line A-A of FIG. 10 and is an explanatory diagram illustrating a structure around the slide rail when the seat state is the stored state and FIG. 13 is a cross-sectional view taken along a line B-B of FIG. 10.

As illustrated in FIG. 12, the rail fixing portion 41 of the rail connection bracket 40 is fixed to a surface of an upper end 6a of the upper rail 6 of the slide rail 4. Then, the rotation shaft attachment portion 42 of the rail connection bracket 40 is bent downward by about 90° from the rail fixing portion 41 and is disposed on the inside of the lower rail 5 and more specifically between the lower rail and the connecting link 30 in the seat width direction. Since the rotation shaft attachment portion 42 of the rail connection bracket 40 is disposed in this way, the height position of the first rotation member 31 is disposed at the same height position as the slide rail 4 when the seat cushion 2 is located at both the first height position and the second height position.

Figure 13:
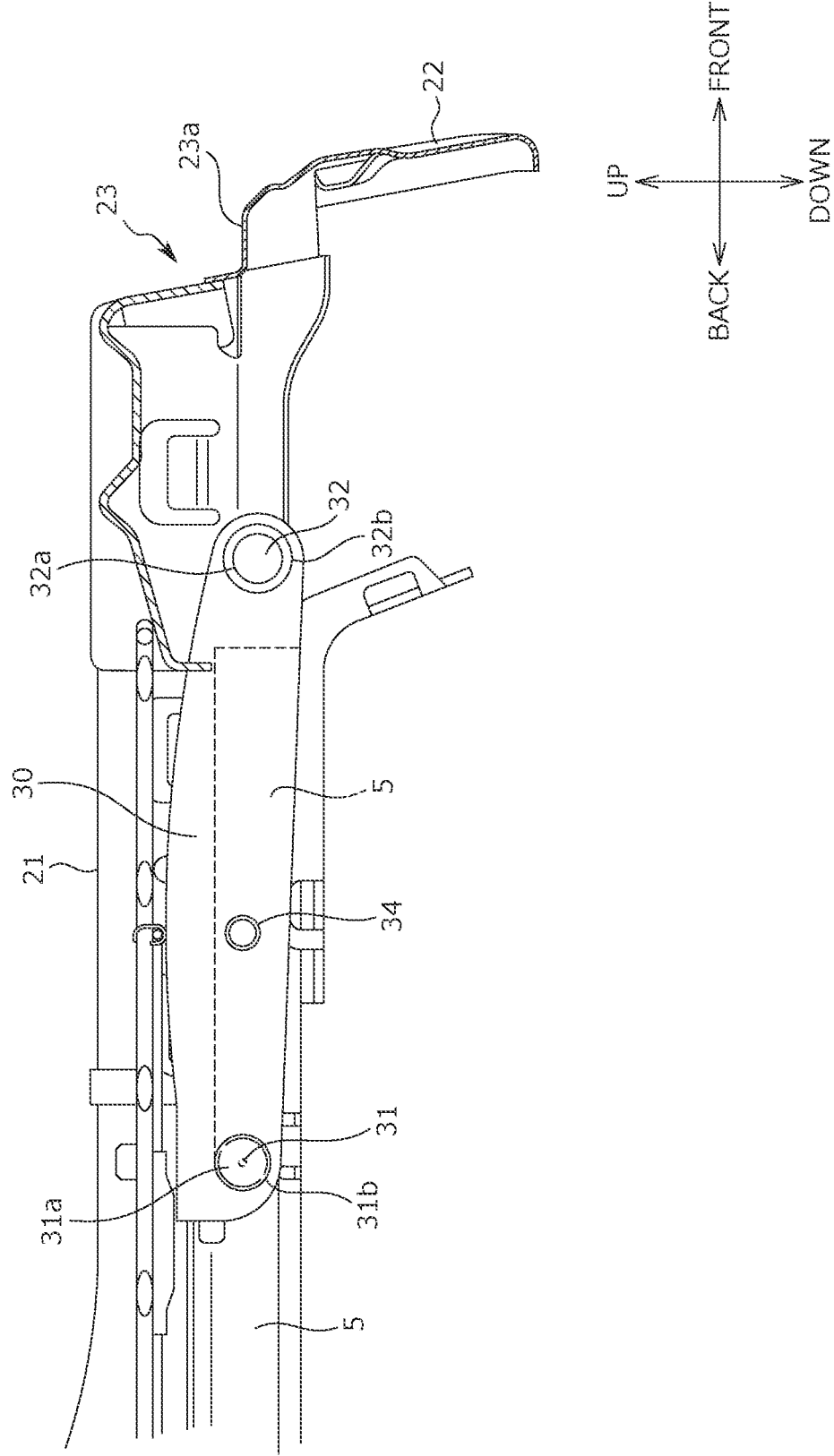
FIG. 13 is a cross-sectional view taken along a line B-B of FIG. 10.

As illustrated in FIGS. 12 and 13, when the seat cushion 2 moves to the second height position (the stored state), the first rotation member 31 is disposed at the same height position as the slide rail 4 in a front view and a side view of the vehicle seat S. According to such a configuration, an increase in size of the vehicle seat S in the up and down direction can be suppressed (that is, a compact size can be realized).

Further, as illustrated in FIG. 13, when the seat cushion 2 moves to the second height position (the stored state), the first rotation member 31 is disposed to overlap the slide rail 4 in the front to back direction of the seat in a side view of the vehicle seat S. According to such a configuration, an increase in size of the vehicle seat S in the front to back direction can be suppressed.

As illustrated in FIGS. 12 and 13, when the seat cushion 2 moves to the second height position (the stored state), both the first rotation member 31 and the second rotation member 32 are disposed at the same height position as the cushion side frame 21 in a front view and a side view of the vehicle seat S. According to such a configuration, an increase in size of the vehicle seat S in the up and down direction can be suppressed.

Further, as illustrated in FIGS. 12 and 13, when the seat cushion moves to the second height position, the second rotation member 32 is disposed at the same height position as the slide rail 4 in a front view and a side view of the vehicle seat S. According to such a configuration, an increase in size of the vehicle seat S in the up and down direction can be suppressed.

As illustrated in FIG. 12, the first rotation member 31 includes an upper end 31a and a lower end 31b and the lower end 31b of the first rotation member 31 is disposed below the upper end 6a of the upper rail 6 in the up and down direction of the seat. According to such a configuration, since there is no limitation in the connection place for the connecting link 30 and the upper rail 6, the degree of freedom in design is improved.

As illustrated in FIG. 12, the second rotation member 32 includes an upper end 32a and a lower end 32b and when the seat cushion 2 moves to the second height position (the stored state), the lower end 32b of the second rotation member 32 is disposed below the lower end 6b of the upper rail 6 and below the lower end 31b of the first rotation member 31 in the up and down direction of the seat.

According to such a configuration, an increase in size of the vehicle seat S in the up and down direction can be suppressed.

As illustrated in FIG. 5, when the seat cushion 2 is located at the first height position (the seated state), the connection pipe 24 is disposed behind the cable member 61 of the slide lock device 60 in the front to back direction of the seat. Further, as illustrated in FIGS. 10 and 11, when the seat cushion 2 moves to the second height position (the stored state), the connection pipe 24 is disposed in front of the cable member 61 in the front to back direction of the seat. According to such a configuration, the interference between the connection pipe 24 and the cable member 61 can be suppressed.

As illustrated in FIG. 10, the connection pipe 24 is disposed between the inclined portion 21b and the curved portion 21c and is disposed above the upper end 31a of the first rotation member 31 and the upper end of the slide rail 4 (in other words, the upper end 6a of the upper rail 6) in the up and down direction of the seat. According to such a configuration, the rigidity of the cushion side frame 21, particularly, the vicinity of the curved portion 21c is improved and the interference between the connection pipe 24 and the first rotation member 31 or the slide rail 4 is suppressed.

As illustrated in FIG. 12, when the seat cushion 2 moves to the second height position (the stored state), the first rotation member 31 is disposed on the inside of the inclined portion 21b and the curved portion 21c of the cushion side frame 21 in the seat width direction and is disposed below the inclined portion 21b and the curved portion 21c in the up and down direction of the seat. According to such a configuration, the interference between the first rotation member 31 and the slide rail 4 can be suppressed when the seat cushion 2 moves from the first height position (the seated state) to the second height position (the stored state).

As illustrated in FIG. 12, when the seat cushion 2 moves to the second height position (the stored state), the slide rail 4 is disposed between the first rotation member 31 and the cushion side frame 21 and the slide rail 4 is disposed between the second rotation member 32 and the cushion side frame 21 in the seat width direction. According to such a configuration, the interference between the cushion side frame 21 and the connecting link 30 is suppressed.

As illustrated in FIG. 13, when the seat cushion 2 moves to the second height position (the stored state), the lower end 31b of the first rotation member 31 and the lower end 32b of the second rotation member 32 are disposed below the lower end 23a of the step portion 23 included in the pan frame 22 constituting the front end of the seat cushion frame 20 in the up and down direction of the seat. According to such a configuration, the interference of the first rotation member 31 and the second rotation member 32 with respect to the seat cushion frame 20 (more specifically, the pan frame 22) is suppressed when the seat cushion 2 moves from the first height position (the seated state) to the second height position (the stored state).

Modified Examples

Although a configuration of the conveyance seat of the present invention has been described so far by exemplifying an example, the above-described embodiment is merely an example and other embodiments can be also supposed.

In the above-described embodiment, the vehicle seat S capable of switching the seat state to the stored state has been described as an example, but a conveyance seat incapable of switching the seat state to the stored state can be used as long as the conveyance seat can move the seat cushion from the first height position to the second height position below the first height position in the up and down direction of the seat. Further, the conveyance seat according to this embodiment can be configured as a double falldown seat.

Hereinafter, a difference between a vehicle seat SX according to a modified example and the vehicle seat S will be described with reference to FIGS. 14 to 19. The vehicle seat SX includes a rubber damper 150 which suppresses a seat cushion 2X from sinking down too much when the seat cushion 2X moves to the second height position (the stored state). In the description below, a structure around the left slide rail 4 will be described as an example, but the rubber damper 150 may be provided to correspond to each of the slide rails 4 on the right side and the left side of the vehicle seat SX.

Figure 14:
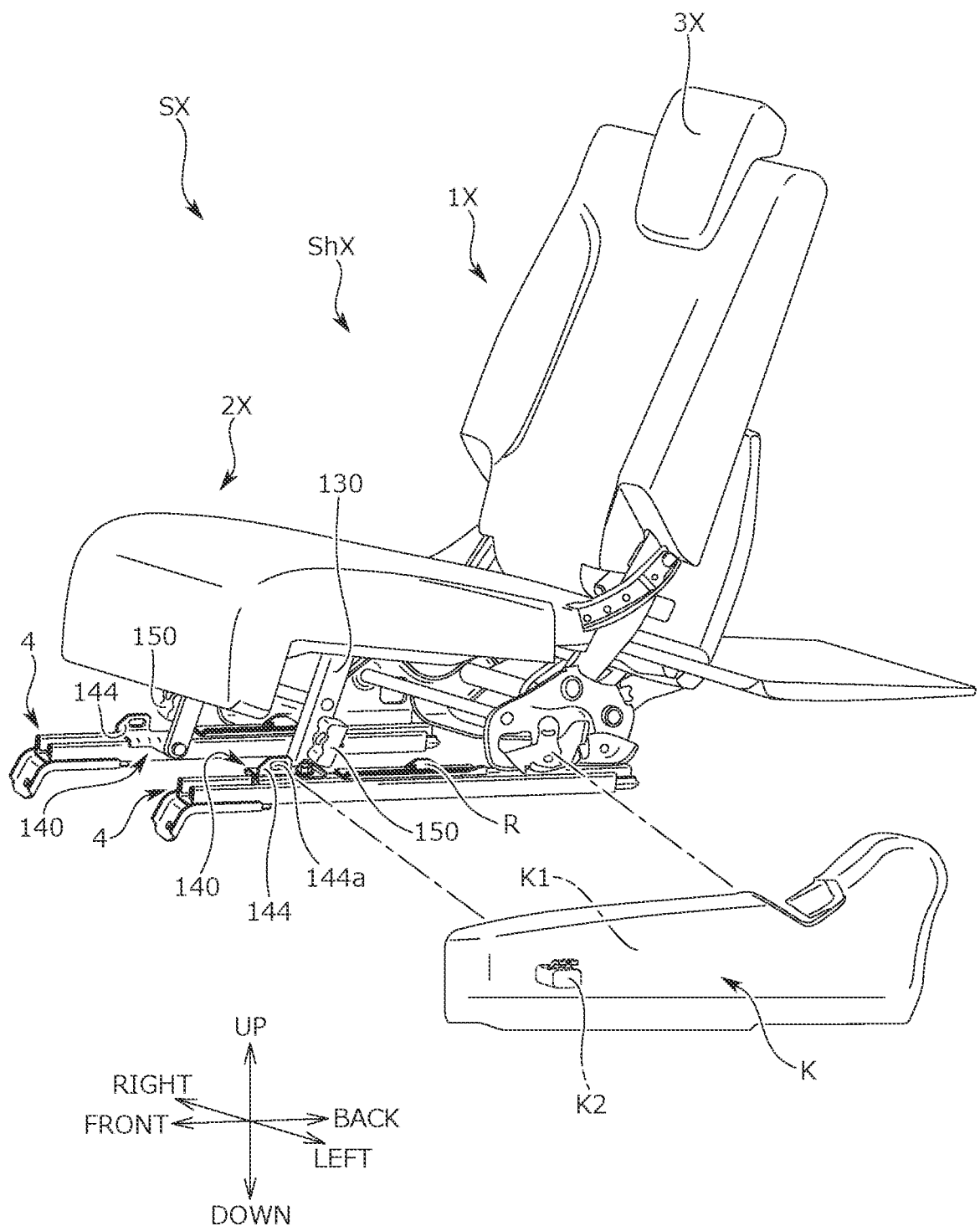
FIG. 14 is a perspective view of a vehicle seat according to a modified example.

As illustrated in FIG. 14, the vehicle seat SX includes a cover member K that covers a side surface of the seat cushion 2X. According to the cover member K, a member such as a link mechanism of the seat cushion 2X is not exposed to the outside. A clip K2 is provided on a back surface K1 of the cover member K. This clip K2 engages with a cover attachment hole 144a of a cover attachment portion 144 of a rail connection bracket 140 to be described later so that the cover member K is fixed to the side surface of the seat cushion 2X.

As illustrated in FIGS. 15 to 18, the rail connection bracket 140 includes a rail fixing portion 141 which is fixed to the upper surface of the upper rail 6 of the slide rail 4 and a rotation shaft attachment portion 142 which is bent downward by about 90° from the rail fixing portion 141 and is disposed on the inside of the lower rail 5 in the seat width direction.

Figure 18:
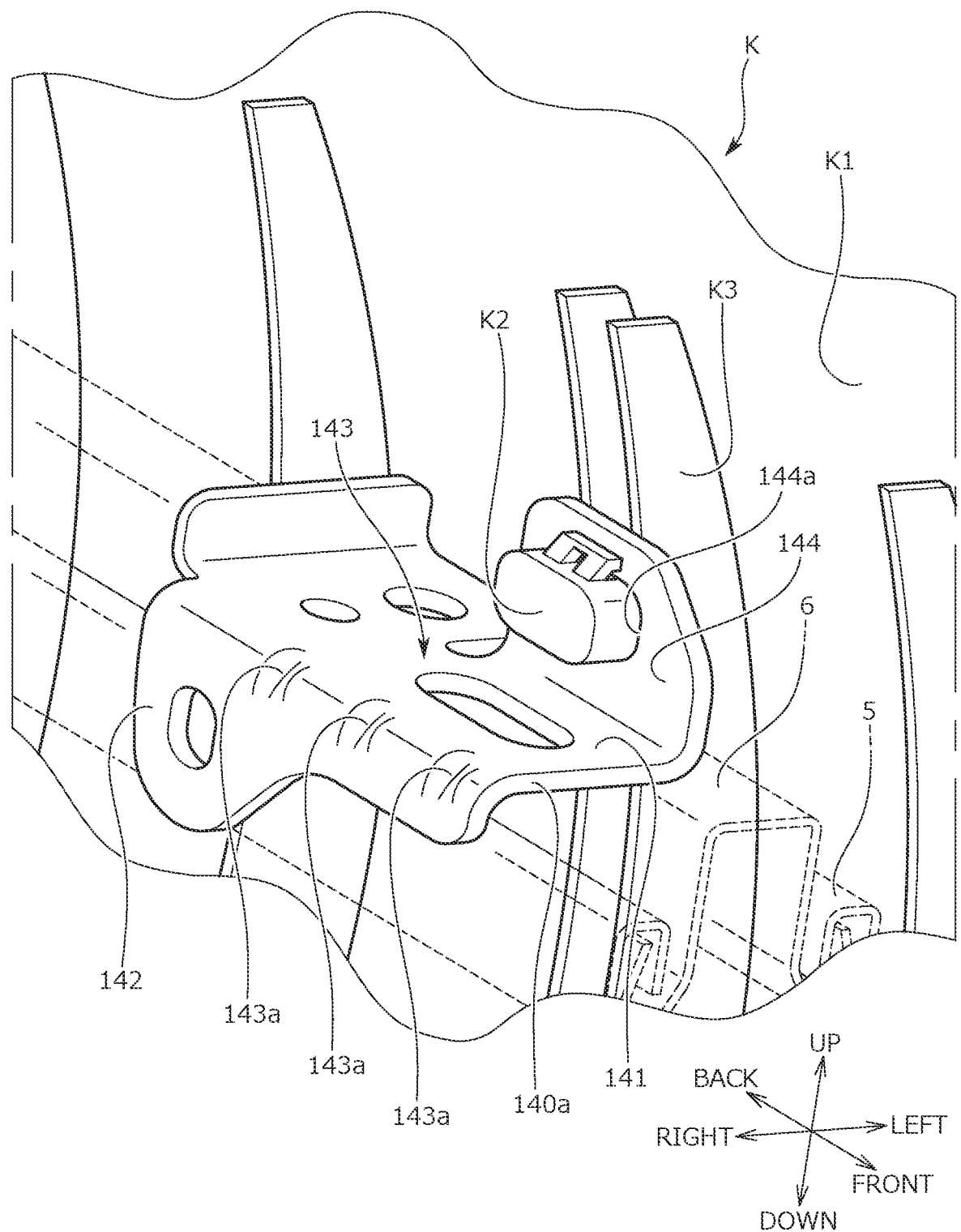
FIG. 18 is a schematic diagram illustrating an engagement state between a cover member and the rail connection bracket.

The rail connection bracket 140 includes a rubber damper contact portion 143 with which a rubber damper 150 to be described later is in contact. As illustrated in FIG. 18, the rubber damper contact portion 143 extends in the front to back direction of the seat and a concave portion 143a which is depressed outward in the seat width direction is formed at the boundary position with the rotation shaft attachment portion 142.

The rail connection bracket 140 includes, as illustrated in FIGS. 15 and 16, a cover attachment portion 144 for attaching the cover member K. The cover attachment portion 144 is formed uprightly perpendicularly to the rail fixing portion 141 and the rubber damper contact portion 143. The cover attachment portion 144 is provided with a cover attachment hole 144a which opens in the seat width direction. The clip K2 of the cover member K engages with the cover attachment hole 144a (FIG. 18). As illustrated in FIG. 18, a rib K3 which extends in the up and down direction is formed on the back surface K1 of the cover member K.

Figure 17:
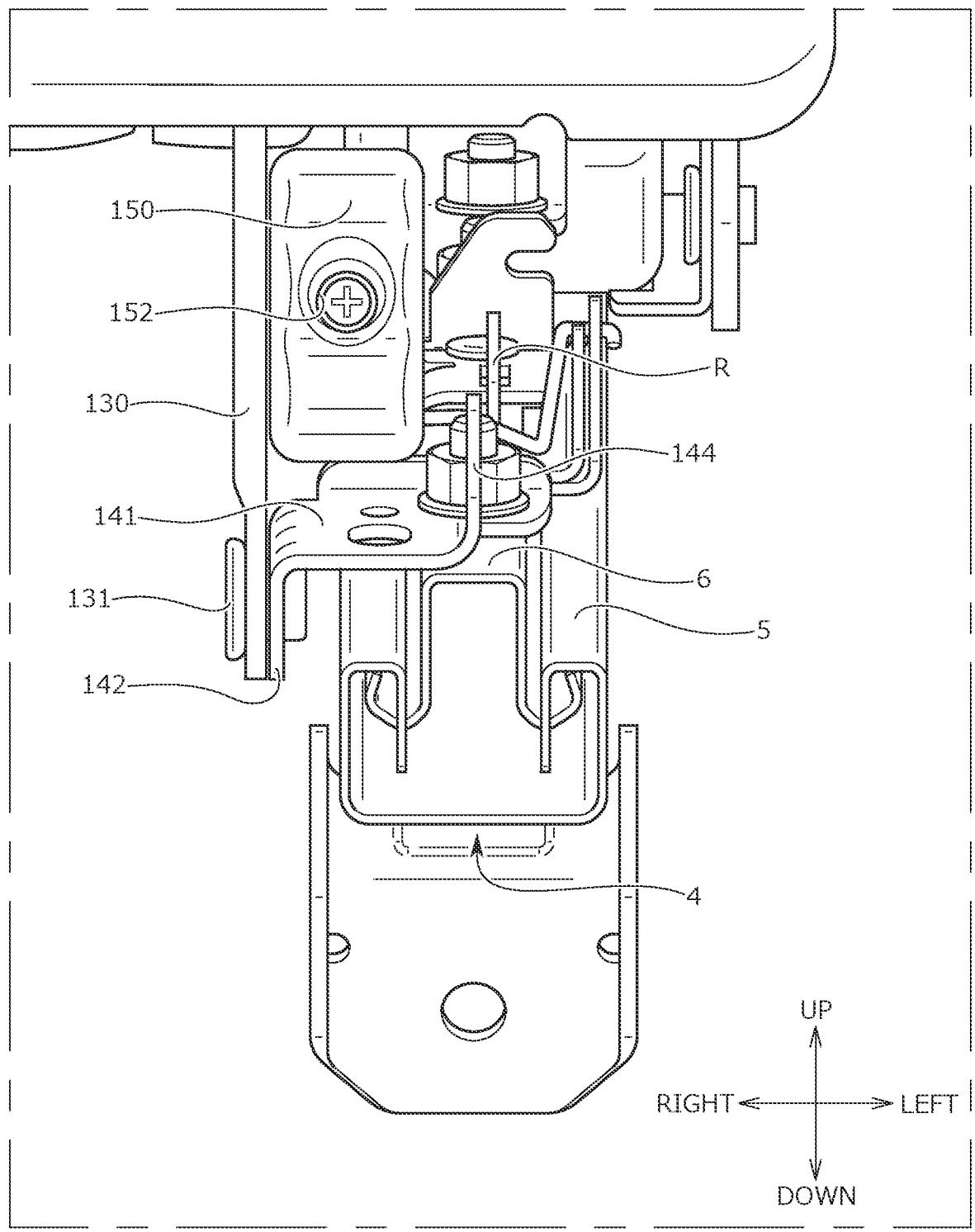
FIG. 17 is a front view illustrating a structure around a slide rail when the seat state is a seated state.

As illustrated in FIGS. 15 and 16, the rubber damper 150 is attached to the rubber damper attachment portion 135 of the connecting link 130. The rubber damper attachment portion 135 is bent to protrude outward in the seat width direction from the connecting link 130 and the rubber damper 150 is attached to the front surface thereof. As illustrated in FIGS. 15 and 17, the rubber damper 150 is provided with a rubber damper attachment hole 152 for attaching the rubber damper 150 to the rubber damper attachment portion 135. A fastening member such as a screw is inserted through the rubber damper attachment hole 152 and the rubber damper 150 is attached to the rubber damper attachment portion 135.

As illustrated in FIGS. 15 and 16, when the seat cushion 2X is located at the first height position (the seated state), an upper surface 150a of the rubber damper 150 is disposed below a lower end 134a of the connecting link connection member 134.

When the seat cushion 2X moves from the first height position (the seated state) to the second height position (the stored state) (FIG. 19), the rubber damper 150 comes into contact with the rubber damper contact portion 143 of the rail connection bracket 140 so as to suppress the seat cushion 2X from sinking down too much.

Although the rubber damper contact portion 143 of the rail connection bracket 140 is provided with the concave portion 143a (FIG. 18), three convex portions 151 of the rubber damper 150 respectively come into contact with three concave portions 143a of the rubber damper contact portion 143 when the seat cushion 2X is located at the second height position (the stored state). Additionally, the number of the convex portion 151 of the rubber damper 150 and the concave portion 143a of the rubber damper contact portion 143 is three, but may be one, two, or four or more and may not be three.

As illustrated in FIGS. 17 and 18, the first rotation member 131 (in other words, the rotation shaft attachment portion 142) is disposed at a position not overlapping the cover attachment hole 144a provided in the cover attachment portion 144 in three directions, that is, the up and down direction of the seat, the front to back direction of the seat, and the seat width direction. More specifically, the first rotation member 131 and the rotation shaft attachment portion 142 are disposed below the cover attachment hole 144a in the up and down direction of the seat, the first rotation member 131 and the rotation shaft attachment portion 142 are disposed behind the cover attachment hole 144a in the front to back direction of the seat, and the first rotation member 131 and the rotation shaft attachment portion 142 are disposed on the inside of the cover attachment hole 144a in the seat width direction. Thus, the interference between the first rotation member 131 and the cover member K is suppressed.

As illustrated in FIG. 19, the length of the rail connection bracket 140 in the longitudinal direction (the front to back direction) is formed to be longer than the length of the rubber damper 150 in the longitudinal direction (the up and down direction in the seated state). Further, when the seat cushion 2X is located at the second height position (the stored state), the front end (that is, the upper surface 150a) of the rubber damper 150 is disposed in front of the front end 140a of the rail connection bracket 140 (FIG. 19).

Figure 20:
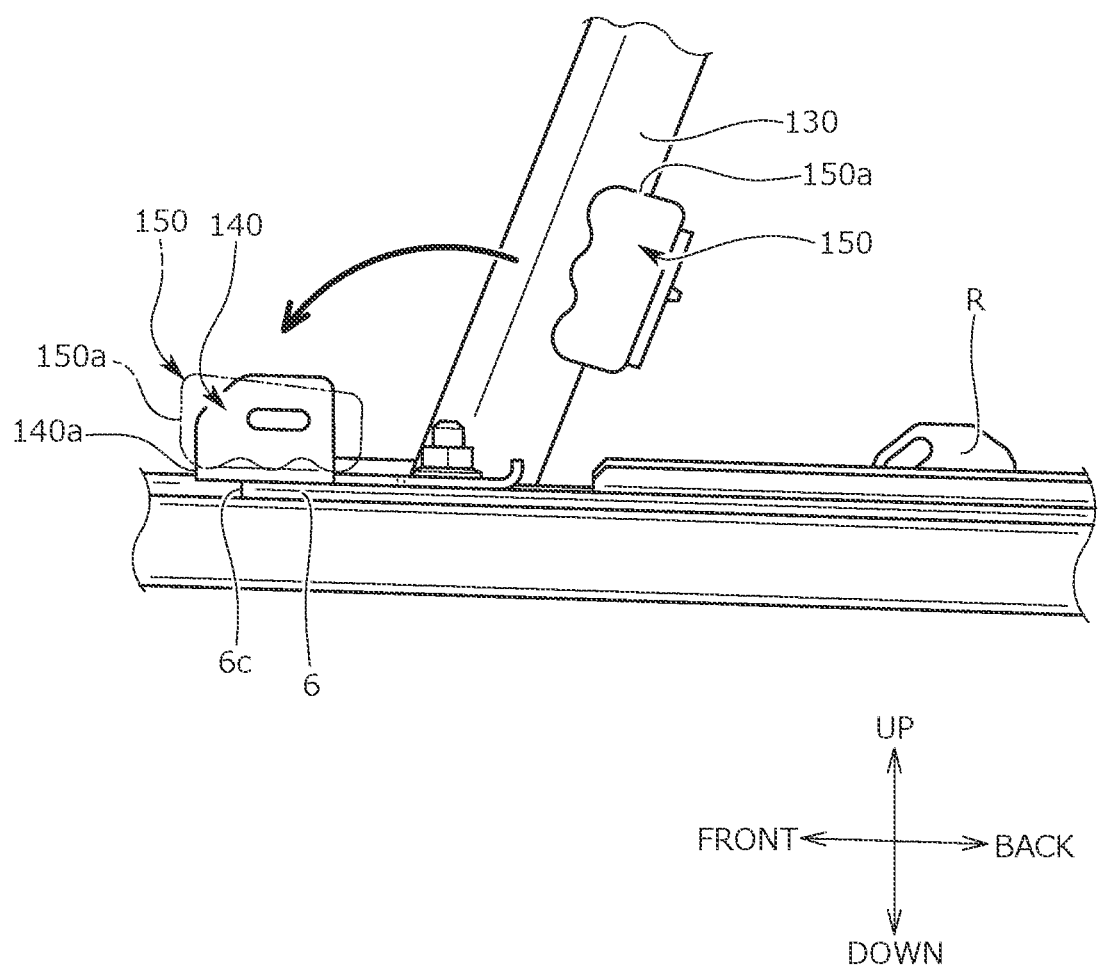
FIG. 20 is a schematic diagram illustrating an example in which the position of the rail connection bracket is changed.

Further, the position of the rubber damper contact portion 143 when the seat cushion 2X is located at the second height position (the stored state) can be changed from the position illustrated in FIGS. 14 to 19. FIG. 20 is a schematic diagram illustrating an example in which the position of the rail connection bracket 140 is changed. The front end (that is, the upper surface 150a) of the rubber damper 150 and the front end 140a of the rail connection bracket 140 (in other words, the front end of the rubber damper contact portion 143) can be disposed at a position protruding forward from the front end 6c of the upper rail 6. According to such a configuration, when the seat cushion 2X is located at the second height position (the stored state), the rubber damper 150 is appropriately supported by the rubber damper contact portion 143 of the rail connection bracket 140.

In the modified example, when the seat state is switched from the seated state to the stored state, the seat cushion 2X moves downward while moving forward in accordance with the forward falling operation of the seat back 1. As another modified example, when the seat state is switched from the seated state to the stored state, the seat cushion 2X can move downward while moving backward in accordance with the forward falling operation of the seat back 1 (FIGS. 21 to 23).

Figure 21:
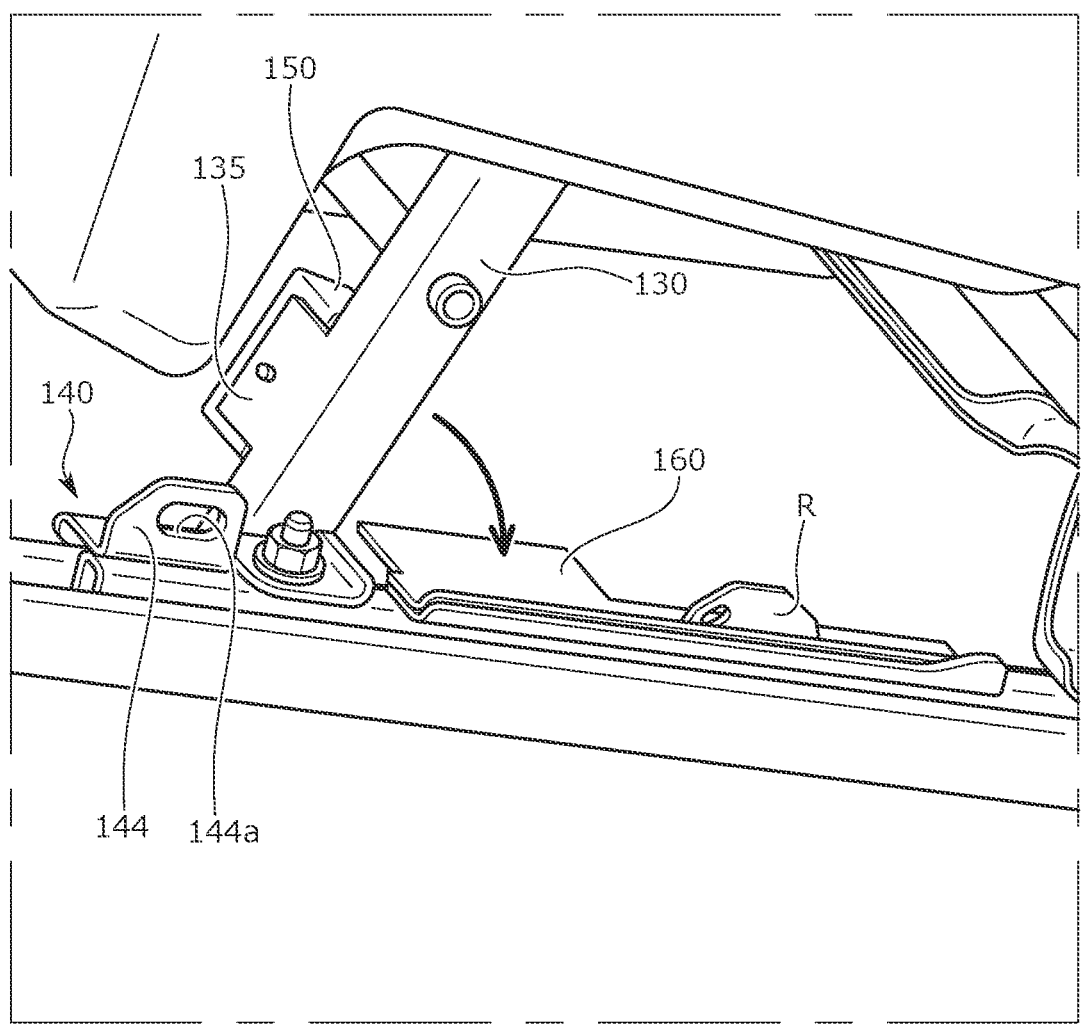
FIG. 21 is an explanatory diagram illustrating a structure around a rail connection bracket when the seat state is a seated state in a vehicle seat according to another modified example.
Figure 22:
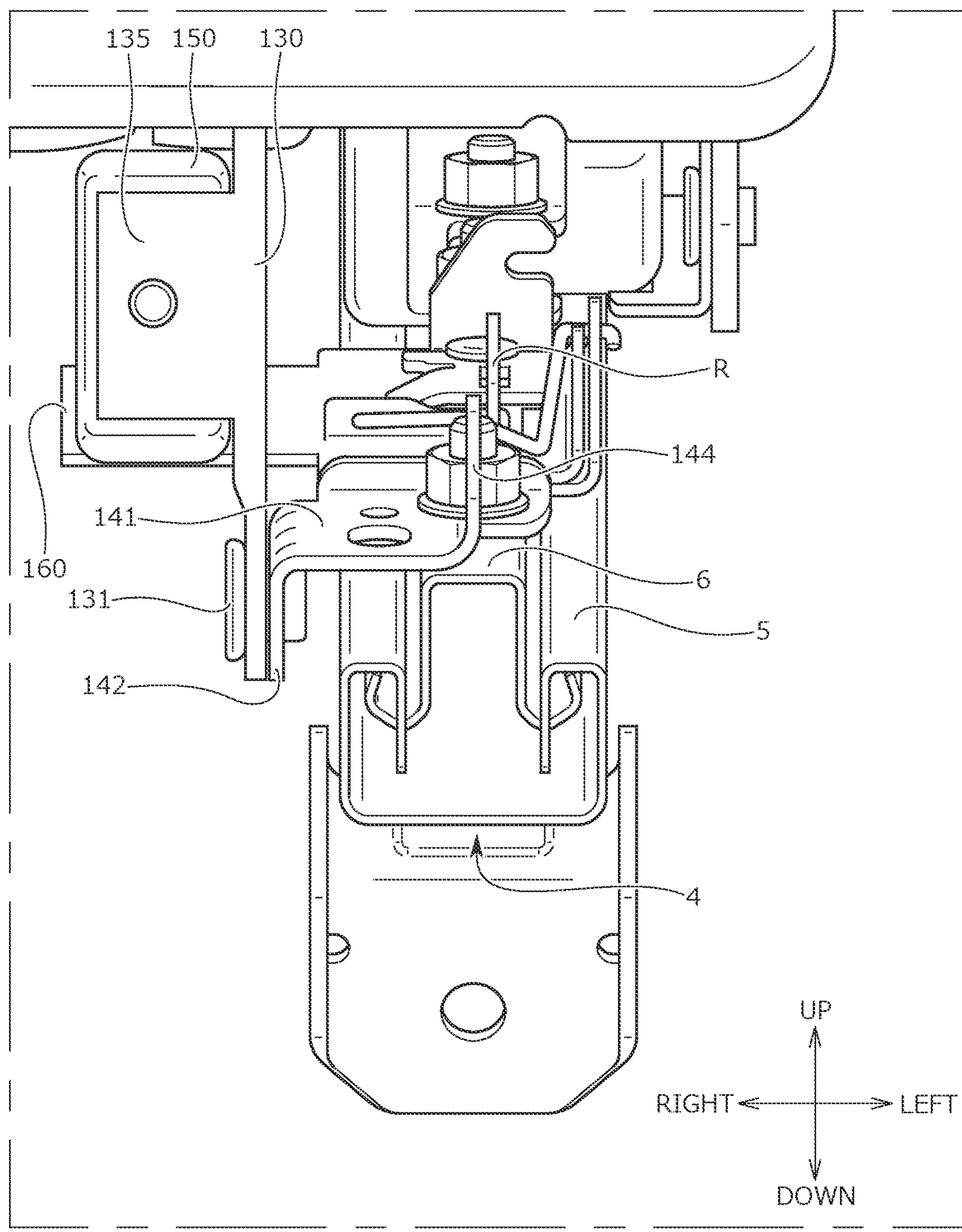
FIG. 22 is a front view illustrating a structure around a slide rail when the seat state is a seated state.

In another modified example, as illustrated in FIGS. 21 and 22, the rubber damper 150 is disposed on the inside of the rail connection bracket 140 in the seat width direction. In other words, the rubber damper 150 is disposed on the inside of the seat width direction with respect to the connecting link 130. That is, the interference between the rubber damper 150 and other members is suppressed when the connecting link 130 rotates backward.

Further, as illustrated in FIGS. 21 to 23, the rubber damper contact portion 160 which contacts the rubber damper 150 when the seat cushion 2X moves to the second height position (the stored state) is disposed on the inside in the seat width direction in relation to the lock plate R for locking the slide movement of the slide rail 4. According to such a configuration, the interference between the lock plate R and the rubber damper contact portion 160 is suppressed.

REFERENCE SIGNS LIST

S, SX: vehicle seat (conveyance seat)
Sh, ShX: seat body
T: trim cover
P: pad member
1, 1X: seat back
2, 2X: seat cushion
3, 3X: headrest
4: slide rail (slide rail)
5: lower rail
  5a: upper end
  5b: lower end
6: upper rail
  6a: upper end
  6b: lower end
  6c: front end
F: seat frame
10: seat back frame
  11: pipe frame
  12: back panel
  13: back side frame
  14: rear bracket
  15: rear connecting pipe
  16: wire
    16a: lower end
20: seat cushion frame
  21: cushion side frame
    21a: flat portion
    21b: inclined portion
    21c: curved portion
  22: pan frame
  23: step portion
    23a: lower end
  24: connection pipe (connection member)
    24a: lower end
  25: pressure receiving member
30: connecting link (connecting member)
  31: first rotation member (first rotation portion)
    31a: upper end
    31b: lower end
  32: second rotation member (second rotation portion)
    32a: upper end
    32b: lower end
  33: cushion connecting bracket 34: connecting link connection member
40: rail connection bracket
  41: rail fixing portion
  42: rotation shaft attachment portion
60: slide lock device
61: cable member
K: cover member
  K1: back surface
  K2: clip
  K3: rib
130: connecting link (connecting member)
  131: first rotation member (first rotation portion)
  134: connecting link connection member
    134a: lower end
  135: rubber damper attachment portion
140: rail connection bracket
  140a: front end
  141: rail fixing portion
  142: rotation shaft attachment portion
  143: rubber damper contact portion
    143a: concave portion
  144: cover attachment portion
    144a: cover attachment hole
150: rubber damper
  150a: upper surface
  151: convex portion
  152: rubber damper attachment hole
R: lock plate
160: rubber damper contact portion

The invention claimed is:

1. A conveyance seat comprising:
a seat back;
a seat cushion which includes a pair of cushion side frames extending in a front to back direction of the conveyance seat;
a slide rail which includes a lower rail and an upper rail supported to be movable relatively with respect to the lower rail and slides the seat back and the seat cushion in the front to back direction of the conveyance seat;
a connecting member that connects the seat cushion and the slide rail to each other;
a first rotation portion which rotatably connects the connecting member to the slide rail; and
a second rotation portion which rotatably connects the connecting member to the seat cushion,
wherein the seat cushion is movable from a first height position to a second height position below the first height position in an up and down direction of the conveyance seat,
wherein when the seat cushion moves to the second height position, the first rotation portion is disposed at the same height position as the slide rail in a side view of the conveyance seat, and
wherein when the seat cushion moves to the second height position, the slide rail is disposed between the first rotation portion and the cushion side frame and between the second rotation portion and the cushion side frame in a width direction of the conveyance seat.

2. The conveyance seat according to claim 1,
wherein a lower end of the first rotation portion is disposed below an upper end of the upper rail in the up and down direction of the conveyance seat.

3. The conveyance seat according to claim 1,
wherein when the seat cushion moves to the second height position, a lower end of the second rotation portion is disposed below a lower end of the upper rail and is disposed below a lower end of the first rotation portion in the up and down direction of the conveyance seat.

4. The conveyance seat according to claim 1,
wherein the seat cushion includes a seat cushion frame,
wherein a step portion is formed at a front end of the seat cushion frame, and
wherein when the seat cushion moves to the second height position, a lower end of the first rotation portion and a lower end of the second rotation portion are disposed below a lower end of the step portion in the up and down direction of the conveyance seat.

5. The conveyance seat according to claim 1,
wherein when the seat cushion moves to the second height position, the first rotation portion and the second rotation portion are disposed at the same height position as the cushion side frame in a side view of the conveyance seat.

6. The conveyance seat according to claim 1,
wherein when the seat cushion moves to the second height position, the second rotation portion is disposed at the same height position as the slide rail in a side view of the conveyance seat.

7. A conveyance seat comprising:
a seat back;
a seat cushion which includes a pair of cushion side frames extending in a front to back direction of the conveyance seat;
a slide rail which includes a lower rail and an upper rail supported to be movable relatively with respect to the lower rail and slides the seat back and the seat cushion in the front to back direction of the conveyance seat;
a connecting member that connects the seat cushion and the slide rail to each other;
a first rotation portion which rotatably connects the connecting member to the slide rail;
a slide lock device which locks a slide movement of the slide rail; and
a cable member that releases a lock state of the slide lock device,
wherein the seat cushion is movable from a first height position to a second height position below the first height position in an up and down direction of the conveyance seat,
wherein when the seat cushion moves to the second height position, the first rotation portion is disposed at the same height position as the slide rail in a side view of the conveyance seat,
wherein the pair of cushion side frames are connected to each other by a connection member,
wherein when the seat cushion is located at the first height position, the connection member is disposed behind the cable member in the front to back direction of the conveyance seat, and
wherein when the seat cushion moves to the second height position, the connection member is disposed in front of the cable member in the front to back direction of the conveyance seat.

8. The conveyance seat according to claim 7,
wherein the cushion side frame includes a flat portion which is disposed on the outside of the slide rail in a width direction of the conveyance seat and an inclined portion which is disposed at the same height position as the slide rail in the up and down direction of the conveyance seat when the seat cushion moves to the second height position and is inclined upward as it goes backward in the front to back direction of the conveyance seat, wherein a curved portion which is curved inward in the width direction of the conveyance seat is formed between the flat portion and the inclined portion, and wherein the first rotation portion is disposed on the inside of the inclined portion and the curved portion in the width direction of the conveyance seat and is disposed below the inclined portion and the curved portion in the up and down direction of the conveyance seat.

9. The conveyance seat according to claim 8, wherein the connection member is disposed between the inclined portion and the curved portion, and wherein the connection member is disposed above the upper end of the first rotation portion and the upper end of the slide rail in the up and down direction of the conveyance seat.

10. A conveyance seat comprising:

a seat back;

a seat cushion which includes a pair of cushion side frames extending in a front to back direction of the conveyance seat;

a slide rail which includes a lower rail and an upper rail supported to be movable relatively with respect to the lower rail and slides the seat back and the seat cushion in the front to back direction of the conveyance seat;

a connecting member that connects the seat cushion and the slide rail to each other; and a first rotation portion which rotatably connects the connecting member to the slide rail, wherein the seat cushion is movable from a first height position to a second height position below the first height position in an up and down direction of the conveyance seat, wherein when the seat cushion moves to the second height position, the first rotation portion is disposed at the same height position as the slide rail in a side view of the conveyance seat, wherein the conveyance seat further comprises a rail connection bracket for connecting the connecting member to the slide rail, and a cover member that covers a side surface of the seat cushion, wherein the rail connection bracket includes a cover attachment portion for attaching the cover member, and wherein the cover attachment portion is located between the cover member and the first rotation portion in a width direction of the conveyance seat.

11. The conveyance seat according to claim 10, further comprising:

a damper, wherein the connecting member includes a damper attachment portion to which the damper is attached, and wherein at least a portion of the first rotation portion is disposed at a same position as the damper in the width direction of the conveyance seat.

12. The conveyance seat according to claim 11, wherein the damper attachment portion is bent to protrude outward in the width direction of the conveyance seat from the connecting member, and wherein the damper is attached to a front surface of the damper attachment portion.

13. The conveyance seat according to claim 11, further comprising:

a second connecting member which is provided being separated from the connecting member in the width direction of the conveyance seat; and a connecting member connection member which connects the connecting member and the second connecting member, wherein when the seat cushion is located at the first height position, an upper surface of the damper is disposed below a lower end of the connecting member connection member.

14. The conveyance seat according to claim 10, wherein a reinforcement portion is provided with the cover member, and wherein the reinforcement portion extends longer in the up and down direction of the conveyance seat than the first rotation portion.

15. The conveyance seat according to claim 10, wherein the cover attachment portion is provided with a cover attachment hole to which the cover member is attached, and wherein the first rotation portion is disposed at a position which does not overlap the cover attachment hole in the up and down direction, in the front to back direction, and in the width direction of the conveyance seat.

16. The conveyance seat according to claim 10, wherein the cover member is provided with a locking portion locked to the rail connection bracket, and wherein, in a state where the cover member is attached to the seat cushion, the first rotation portion is disposed below the locking portion.

17. The conveyance seat according to claim 10, wherein the cover attachment portion is provided with a hole which opens in the width direction of the conveyance seat, and wherein the first rotation portion and the hole are disposed at different height positions in a height direction of the conveyance seat.

18. The conveyance seat according to claim 10, wherein the rail connection bracket includes a fixing portion which is fixed to the upper rail, and wherein the first rotation portion is disposed below the fixing portion.

19. The conveyance seat according to claim 10, wherein the rail connection bracket includes a fixing portion which is fixed to the upper rail, and wherein the cover attachment portion is formed uprightly perpendicularly to the fixing portion.

20. The conveyance seat according to claim 10, further comprising:

a damper, wherein the rail connection bracket includes:

a damper contact portion with which the damper comes into contact when the seat cushion moves to the second height position; and a rotation shaft attachment portion to which the first rotation portion is attached, wherein the damper contact portion extends in the front to back direction of the conveyance seat, wherein a concave portion which is depressed outward in the width direction of the conveyance seat is formed at a boundary position of the damper contact portion and the rotation shaft attachment portion, and wherein the first rotation portion includes a portion which is located on an outside of the connecting member in the width direction of the conveyance seat and on an outside of the concave portion in the width direction of the conveyance seat.

* * * * *